(12) United States Patent
Matsumoto et al.

(10) Patent No.: US 6,556,909 B2
(45) Date of Patent: Apr. 29, 2003

(54) LANE KEEP CONTROL FOR VEHICLE

(75) Inventors: Shinji Matsumoto, Yokohama (JP); Takeshi Kimura, Kanagawa (JP); Taku Takahama, Kanagawa (JP); Hiromitsu Toyota, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/838,581

(22) Filed: Apr. 20, 2001

(65) Prior Publication Data

US 2002/0007239 A1 Jan. 17, 2002

(30) Foreign Application Priority Data

Apr. 25, 2000 (JP) ........................................ 2000-123431

(51) Int. Cl.[7] ................................................. B62D 6/00
(52) U.S. Cl. ............................. 701/41; 701/23; 701/48; 180/204; 180/401; 180/443; 180/446
(58) Field of Search ............................. 701/41, 48, 23; 180/204, 401, 443, 446

(56) References Cited

U.S. PATENT DOCUMENTS

| 4,720,790 | A | * | 1/1988 | Miki et al. ................ | 180/415 |
|---|---|---|---|---|---|
| 4,973,294 | A |   | 11/1990 | Kobari et al. ............. | 475/150 |
| 4,998,593 | A | * | 3/1991 | Karnopp et al. ........... | 180/244 |
| 5,089,966 | A |   | 2/1992 | Fukushima et al. ..... | 364/424.05 |
| 5,367,457 | A | * | 11/1994 | Ishida ....................... | 180/169 |
| 5,373,911 | A | * | 12/1994 | Yasui ........................ | 180/168 |
| 5,388,658 | A | * | 2/1995 | Ando et al. ................ | 180/197 |
| 5,642,281 | A | * | 6/1997 | Ishida et al. .............. | 180/410 |
| 5,828,972 | A | * | 10/1998 | Asanuma et al. .......... | 180/446 |
| 5,845,222 | A | * | 12/1998 | Yamamoto et al. ........ | 180/422 |
| 5,852,787 | A | * | 12/1998 | Fodor et al. ............. | 280/124.1 |
| 6,021,367 | A | * | 2/2000 | Pilutti et al. ............. | 180/411 |
| 6,053,270 | A | * | 4/2000 | Nishikawa et al. ........ | 180/168 |

FOREIGN PATENT DOCUMENTS

| JP | 5-23989 | 4/1993 |
|---|---|---|
| JP | 7-29554 | 4/1995 |
| JP | 11-96497 | 4/1999 |

* cited by examiner

Primary Examiner—William A. Cuchlinski, Jr.
Assistant Examiner—Eric M Gibson
(74) Attorney, Agent, or Firm—Foley & Lardner

(57) ABSTRACT

A vehicle includes a first actuating system having an automatic steering actuator to bring the front wheel steer angle to a calculated target front wheel steer angle for lane keeping, and a second actuating system such as a front and rear roll stiffness distribution control system, a front and rear driving force distribution control system, a rear wheel steering system, and a differential limiting force control system. By controlling the second actuating system in accordance with the automatic steering operation, a control unit adjusts the steering characteristic of the vehicle in a direction to improve the yawing response or in a direction to improve the running stability.

23 Claims, 12 Drawing Sheets

FIG.3
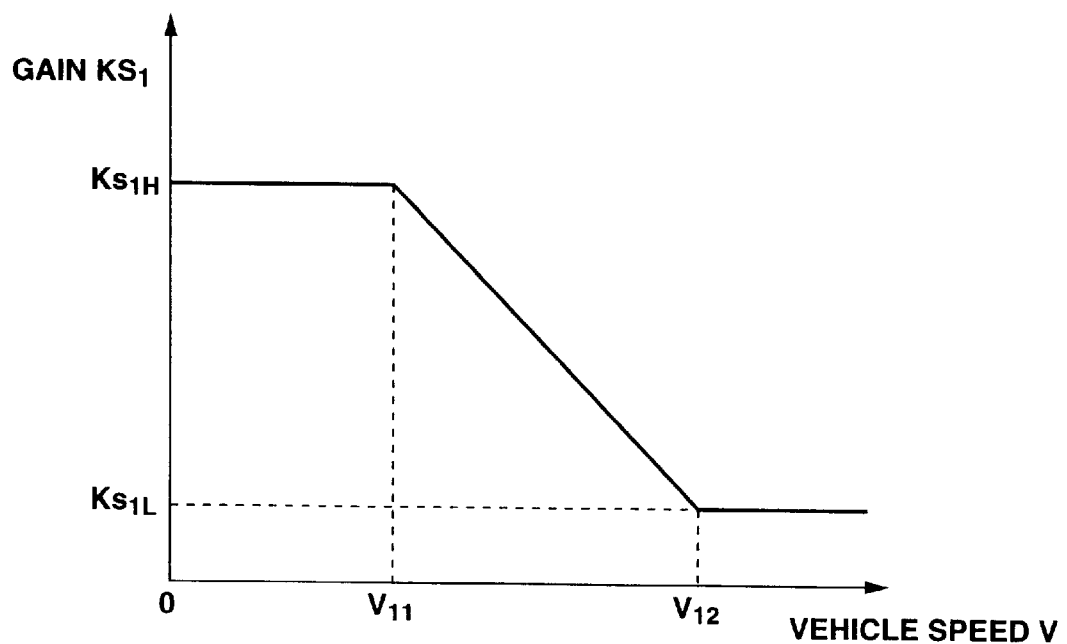
FIG.4A
FIG.4B
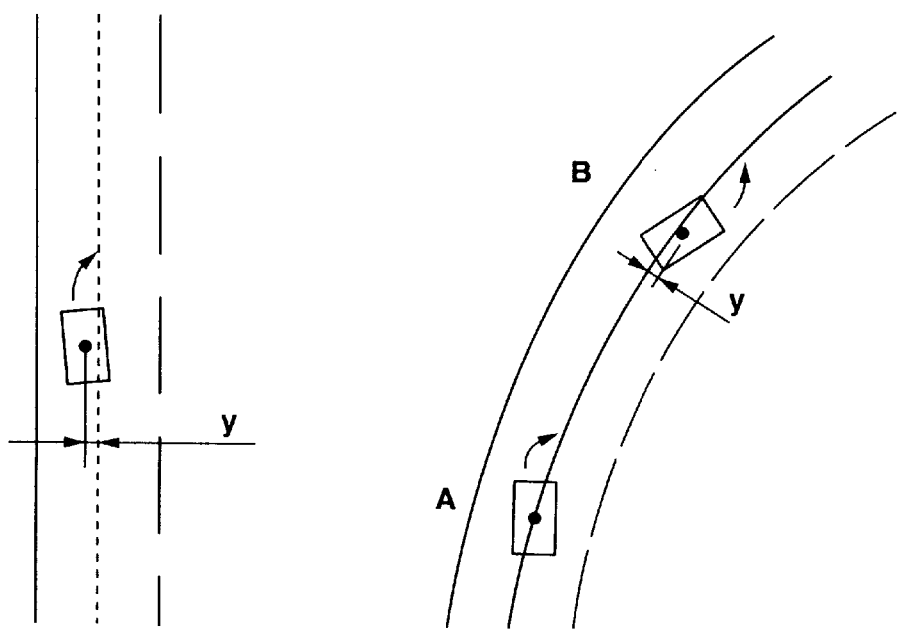

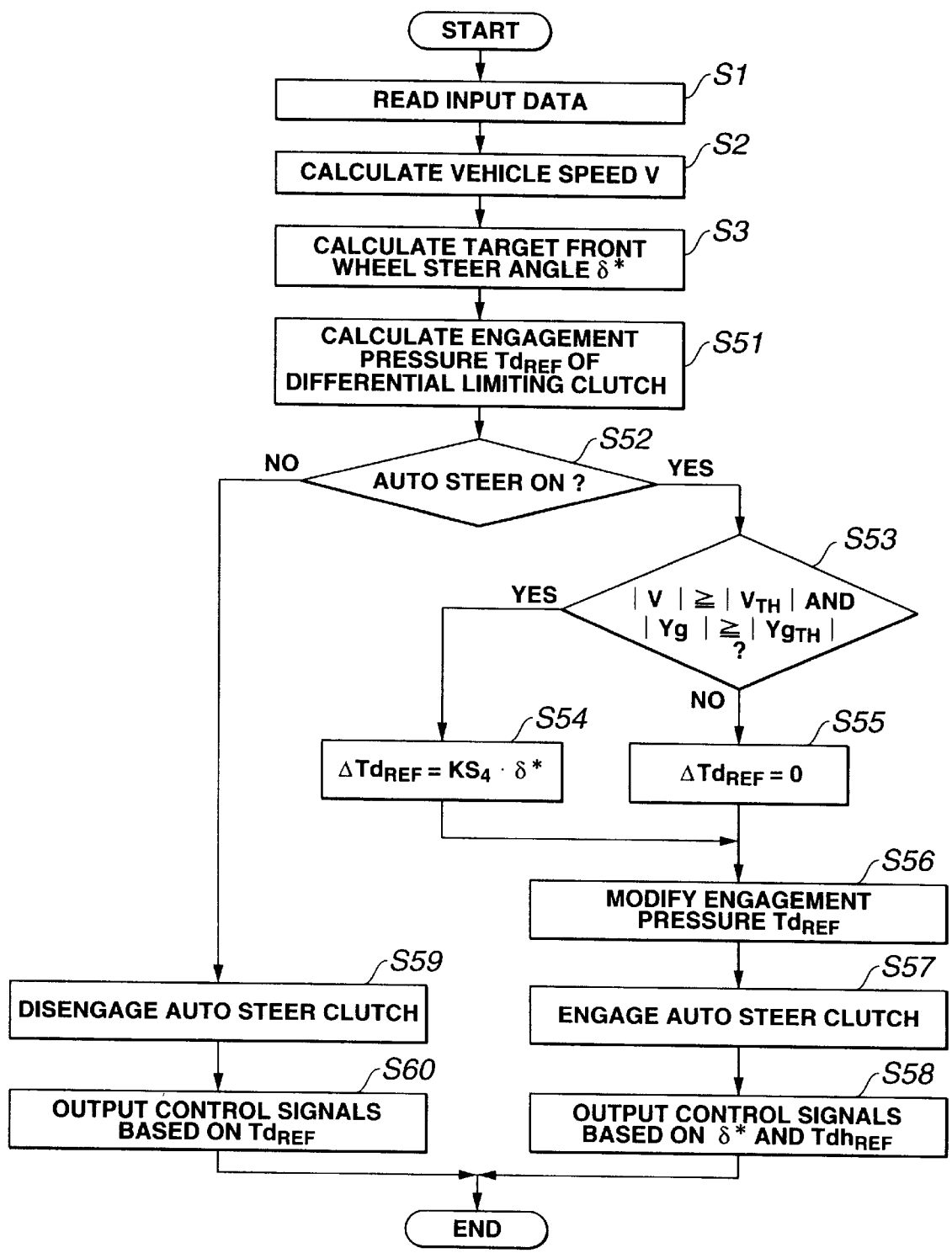

LANE KEEP CONTROL FOR VEHICLE

BACKGROUND OF THE INVENTION

The present invention relates to a lane keep support system or lane keeping apparatus for vehicles.

A Japanese Published Patent Application Kokai No. H11 (1999)-96497 discloses a lane keep system for keeping a controlled vehicle in a lane of a road. This system is arranged to hold a running course of the controlled vehicle within a lane by calculating a side deviation of a running position of the controlled vehicle from a reference position in the lane, by using this side deviation to calculate a steering control torque of a magnitude which a driver can readily overcome, and by producing an actual steering torque in a direction to reduce the side deviation to achieve the calculated steering control torque with a steering actuator.

SUMMARY OF THE INVENTION

It is an object of the present invention to provide a lane keeping apparatus and/or method capable of producing a steering torque for lane keeping with a smaller steering actuator.

According to the present invention, a lane keeping apparatus comprises: an automatic steering section comprising a steering actuator to reduce a deviation of an actual wheel steer angle of a controlled vehicle from a calculated target wheel steer angle for lane keeping; and a steering characteristic adjusting section to adjust a steering characteristic of the controlled vehicle in the case of an automatic steering mode of the automatic steering section, in a first direction to improve a yawing response of the controlled vehicle or in a second direction to improve a running stability of the controlled vehicle in accordance with a steering amount of the automatic steering section.

A lane keeping apparatus according to the invention may comprise: automatic steering means for calculating a target wheel steer angle for lane keeping and for controlling a steering actuator to bring an actual wheel steer angle of a controlled vehicle to the target wheel steer angle; and steering characteristic adjusting means for adjusting a steering characteristic of the controlled vehicle in the case of an automatic steering mode of the automatic steering means, in accordance with a parameter, such as the target wheel steer angle, representing a steering amount of the automatic steering means in one of the first and second directions.

A lane keep control method according to illustrated embodiments of the present invention comprises: calculating a target wheel steer angle to achieve an automatic steering control for lane keeping: determining a modification quantity to adjust a steering characteristic of the controlled vehicle in accordance with a parameter representing a steering amount of the automatic steering control; and controlling an actual wheel steer angle of the controlled vehicle so as to bring the actual wheel steer angle to the target wheel steer angle, and adjusting the steering characteristic of the controlled vehicle in accordance with the modification quantity in one of a first direction to improve a yawing response of the controlled vehicle and a second direction to improve a running stability of the controlled vehicle.

A vehicle according to illustrated embodiments of the invention comprises: a first actuating system comprising a lane keeping automatic steering actuator to vary a first manipulated variable to bring an actual wheel steer angle of the vehicle to a target wheel steer angle calculated for lane keeping; a second actuating system to vary a second manipulated variable affecting a steering characteristic of the vehicle; and a control unit to adjust the steering characteristic of the vehicle by modifying the second manipulated variable in accordance with a steering amount of the first actuating system. The second actuating system may be at least one of a front and rear roll stiffness distribution control system such as an active suspension system or a system capable of varying damping forces of shock absorbers, a front and rear driving force distribution control system, a four wheel steering system, and a differential limiting amount control system.

BRIEF DESCRIPTION OF THE DRAWINGS

FIG. 3 is a graph showing a characteristic of a control gain $KS_1$ in the lane keeping system of the first embodiment.

FIGS. 4A and 4B are schematic views for illustrating operations of the lane keeping system according to the first embodiment.

FIG. 13 is a flowchart of a control procedure performed by the lane keeping system of the fourth embodiment.

DETAILED DESCRIPTION OF THE INVENTION

Figure 1A:
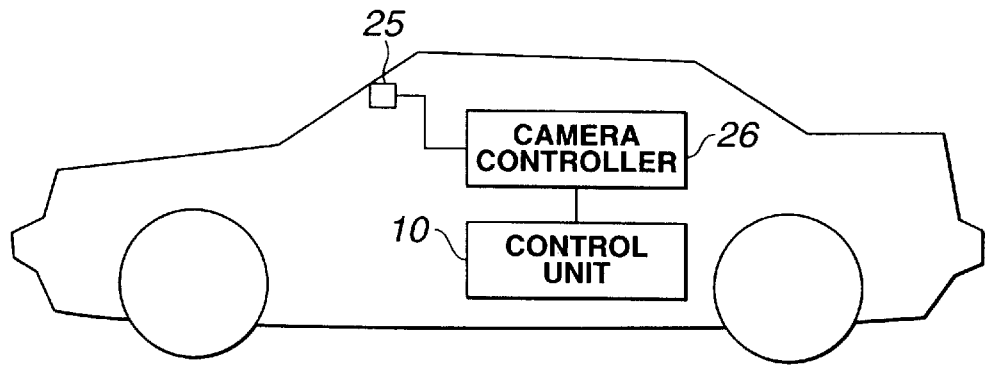
FIG. 1A is a schematic view showing a vehicle equipped with a lane keeping system according to a first embodiment of the present invention.
Figure 1B:
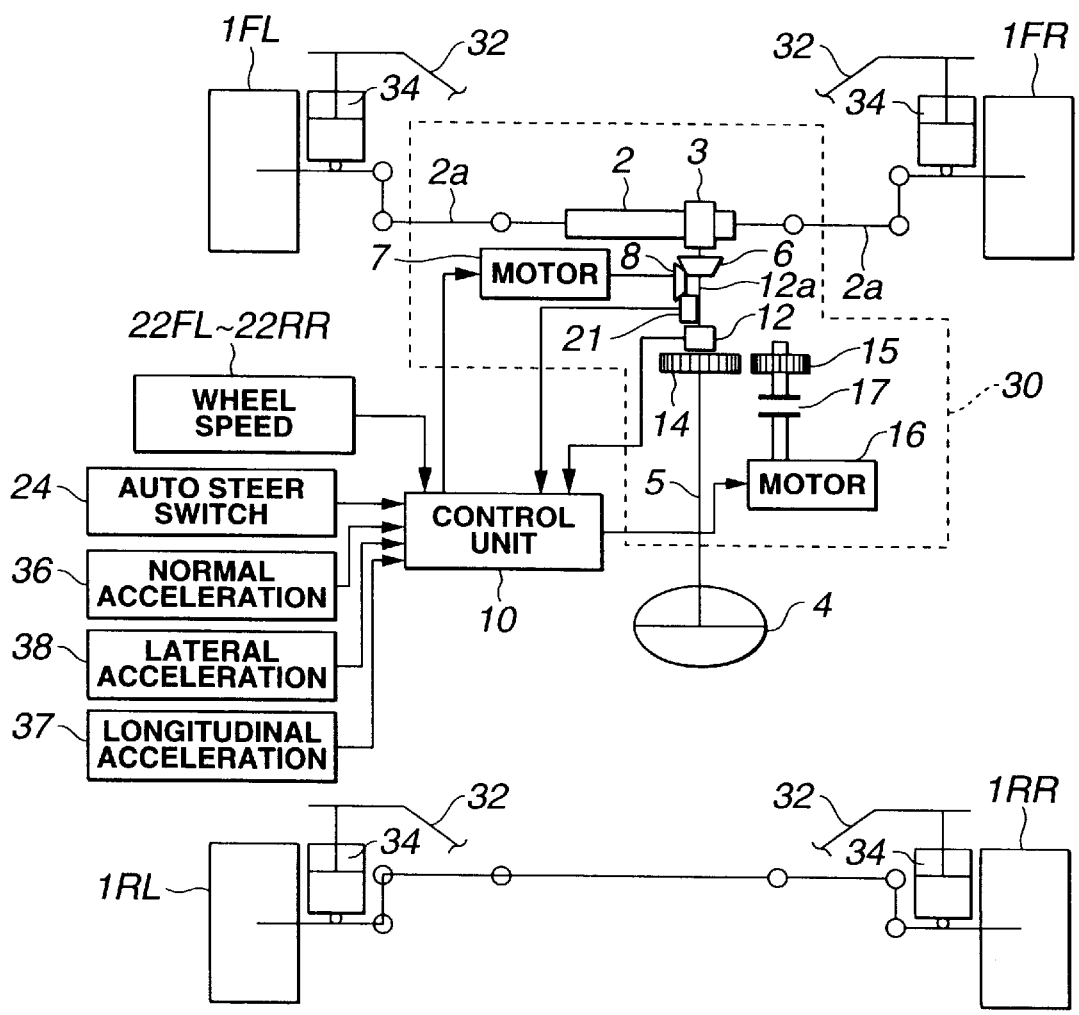
FIG. 1B is a schematic view showing the lane keeping system according to the first embodiment.

FIGS. 1A and 1B shows a lane keeping apparatus or lane keeping control system according to a first embodiment of the present invention.

A vehicle shown in FIGS. 1A and 1B is a controlled vehicle equipped with the lane keeping apparatus. The vehicle has front left and right wheels 1FL and 1FR and rear left and right wheels 1RL and 1RR, and an ordinary rack and pinion type steering mechanism for steering the front wheels. The rack and pinion steering mechanism includes a rack 2 connected with tie rods 2a of front wheels 1FL and 1FR, a pinion 3 in engagement with rack 2, a steering wheel 4 and a steering shaft 5 transmitting a steering torque inputted by the driver to steering wheel 4, to pinion 3. The rack 2, pinion 3, steering wheel 4 and steering shaft 5 constitute a steering system.

A ring gear 6 forming a reduction gearing is coaxially fixed above pinion 3 to steering shaft 5. This ring gear 6 is engaged with a ring gear 8 connected with a drive shaft of a steering assist motor 7. Under the control of duty-controlled pulse current supplied from a control unit 10, steering assist motor 7 produces a steering assist force in accordance with the steering torque. Ring gears 6 and 8, steering assist motor 7 and control unit 10 functioning to control steering assist motor 7 constitute a power steering system.

Above ring gear 6 on steering shaft 5, there is provided a steering torque sensor 12 forming a torque sensing mechanism. This torque sensing mechanism is composed of a torsion bar 12a connecting the lower end of steering shaft 5 with the upper end of pinion 6, and steering torque sensor 12. Steering torque sensor 12 senses the steering torque by sensing the amount of torsion of torsion bar 12a and delivers a steering torque T representing the magnitude of the steering torque in the form of voltage signal to control unit 10.

An automatic steering mechanism for automatically steering front wheels 1FL and 1FR is provided above steering torque sensor 12 on steering shaft 5. The automatic steering mechanism includes a driven gear 14 mounted coaxially with steering shaft 14, a drive gear 15 engaging with driven gear 14, and an automatic steering motor 16 for driving drive gear 15. A clutch mechanism 17 is interposed between automatic steering motor 16 and drive gear 15. Clutch mechanism 17 is engaged only in the case of an automatic steering mode, and otherwise disengaged so that the rotation of automatic steering motor 16 cannot be inputted to steering shaft 5. Automatic steering mechanism inclusive of clutch mechanism 17 constitute a steering actuator operating under the control of control signal sent from control unit 10, and serves as a first actuating system of the vehicle.

The power steering system, steering actuator, steering torque sensor 12 and a later-mentioned steering angle sensor 21 constitute a steering mechanism 30.

Various sensors are mounted in the vehicle. Steering angle sensor 21 determines an actual front wheel steer angle $\delta_F$ of front left and right wheels 1FL and 1FR from a rotational angle of steering shaft 5, and supplies actual front wheel steer angle $\delta_F$ to control unit 10. Four wheel speed sensors 22FL, 22FR, 22RL and 22RR sense wheel speeds of the front and rear wheels and supply wheel speeds to control unit 10.

An automatic steer switch 24 is an input device by which the driver can command the automatic steering control mode of the automatic steering mechanism. When automatic steer switch 24 is turned on by the driver, a switch signal in an "H" state is delivered to control unit 10.

A camera 25 such as a CCD camera is provided to obtain a forward image of a road ahead of the vehicle. In this example, camera 25 is a monocular camera mounted on an inner mirror stay in the passenger compartment. Picture image data obtained by camera 25 is supplied to a camera controller 26. According to an image processing method of conventional technology, camera controller 26 detects a lane marker near the controlled vehicle by the technique of binary image or other image processing technique, and calculates a side deviation y of the controlled vehicle in a lane which the controlled vehicle is following, a yaw angle Φ with respect to a tangent to the lane marker, and a curvature β of the lane ahead of the controlled vehicle. The results of the calculation are outputted to control unit 10.

Four hydraulic cylinders 34 are components of an active suspension system (as a second actuating system). Each hydraulic cylinder 34 is provided between a vehicle body member 32 and a unique one of front and rear wheels 1FL~1RR. By controlling a fluid pressure supplied to each hydraulic cylinder 34 with a hydraulic control circuit, control unit 10 carries out roll control, bounce control and pitch control to stabilize the vehicle behavior.

Each of normal (or vertical) acceleration sensors 36 senses a normal acceleration of the controlled vehicle in an up and down direction or z-direction at a predetermined position. A longitudinal acceleration sensor 37 senses a longitudinal acceleration of the controlled vehicle in a front and rear direction or x-direction at a predetermined position. A lateral acceleration sensor (or side acceleration sensor) 38 senses a lateral acceleration or a side acceleration of the controlled vehicle, acting in a lateral direction at a predetermined position. The sensed accelerations are supplied to control unit 10.

Control unit 10 of this example is a digital system such as a computer system including at least one microcomputer as a main component. Control unit 10 collects input information on vehicle operating conditions and road conditions by receiving signals from various input devices including the above-mentioned sensors and switch, and performs various control actions in accordance with the input information. In accordance with the input information, control unit 10 produces a steering assist force corresponding to a steering torque T produced in steering shaft 5 by driving steering assist motor 7, and performs the automatic steering control by driving automatic steering motor 16 so as to keep a travel of the controlled vehicle correctly along a lane when automatic steer switch 24 is in the on state. Moreover, by controlling the fluid pressures to hydraulic cylinders 34, control unit 10 suppresses changes in vehicle body position or posture and stabilizes the vehicle behavior with bounce control, roll control and pitch control. In this case, control unit 10 functions to increase a roll stiffness distribution to the rear wheels when the steerable wheels are to be steered by automatic steering motor 16 in the automatic steering mode in a direction away from the neutral position, and to increase a roll stiffness distribution to the front wheels when the steerable wheels are to be steered by automatic steering motor 16 in the automatic steering mode in a direction toward the neutral position.

Figure 2:
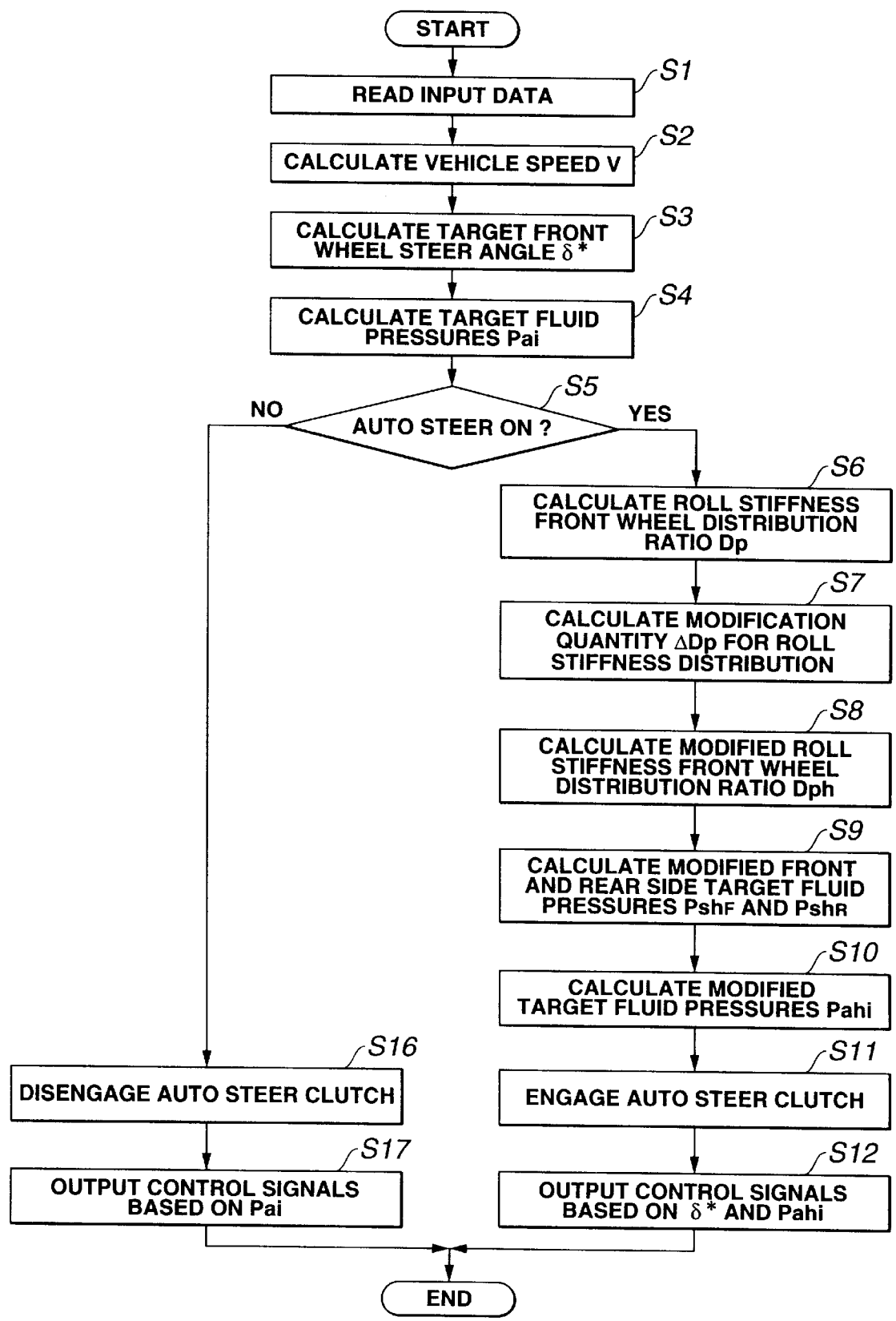
FIG. 2 is a flowchart of a control procedure performed by the lane keeping system of the first embodiment.

FIG. 2 shows a control procedure which control unit 10 performs for the automatic steering control and the control for suppressing changes in the vehicle body position or posture. This control procedure is executed as timer interrupt routine periodically at regular time intervals of a predetermined sampling time, for example 10 msec.

At step S1, control unit 10 reads signals of the sensors and other input devices to collect the input information. The input information obtained at step S1 includes actual front wheel steer angle $\delta_F$ of steering angle sensor 21, wheel speeds of wheel speed sensors 22FL~22RR, switch signal of auto steer switch 24, normal acceleration Zgi (where i=FL~RR) of normal acceleration sensors 36, longitudinal acceleration Xg of longitudinal acceleration sensor 37, and lateral acceleration Yg of lateral acceleration sensor 38. Control unit 10 further obtains yaw angle Φ of the controlled vehicle, side deviation y of the controlled vehicle and curvature β of the lane detected by camera controller 26.

Then, control unit 10 proceeds to step S2, and determines a vehicle speed V. In this example, vehicle speed V is an average of front wheel speeds $V_{WFL}$ and $V_{WFR}$ of front wheel speed sensors 22FL and 22FR.

$$V = (V_{WFL} + V_{WFR})/2 \quad (1)$$

Then, at step S3, control unit 10 calculates a target front wheel steer angle δ*. In this example, target front wheel steer angle δ* is calculated from the yaw angle Φ, side deviation y and curvature β according to the following equation.

$$\delta^* = Ka \cdot \Phi + Kb \cdot y + Kc \cdot \beta \quad (2)$$

In this equation, Ka, Kb and Kc are control gains varying in dependence on vehicle speed V. In this example, the steer angle is positive in the case of rightward steering direction, and negative in the case of leftward steering direction.

At next step S4, control unit 10 determines target control fluid pressures Pai (i=FL~RR) for the hydraulic cylinders 34 of the four wheels. In this example, target fluid pressures Pai are determined in accordance with normal accelerations Zgi, lateral acceleration Yg, and longitudinal acceleration Xg as in known active suspension control systems so as to control a bouncing control quantity, a rolling control quantity and a pitching control quantity.

In this example, target fluid pressures Pai are calculated from normal accelerations Zgi, lateral acceleration Yg, and longitudinal acceleration Xg. However, the present invention is not limited to this example. It is possible to employ various other calculating methods to calculate target fluid pressures Pai. For example, the control system may be arranged to perform a vehicle level or height control by using one or more vehicle level or height sensors, or to perform a preview control.

At step S5 following step S4, control unit 10 examines whether auto steer switch 24 is in the on state or not, by examining the switch signal from auto steer switch 24. When auto steer switch 24 is in the on state to command the automatic steering mode, then control unit 10 proceeds from step S5 to step S6.

At step S6, control unit 10 calculates a front wheel roll stiffness distribution (or distribution ratio) Dp allotted to the front wheels, from target fluid pressures Pai according to the following equation.

$$Dp = P_{SF}/(P_{SF} + P_{SR})$$

$$P_{SF} = Pa_{FL} + Pa_{FR}$$

$$P_{SR} = Pa_{RL} + Pa_{RR} \quad (3)$$

At step S7 following step S6, control unit 10 calculates a roll stiffness distribution modification quantity ΔDp according to the following equation (4).

$$\Delta Dp = KS_1 \cdot |\delta^*| \quad (4)$$

In this equation, $KS_1$ is a control gain varying in dependence on vehicle speed V. In this example, control gain $KS_1$ decreases monotonically with increase in vehicle speed V as shown in FIG. 3. Control gain $KS_1$ is set invariably equal to a relatively large value $K_{S1H}$ in a low vehicle speed range from zero to a medium vehicle speed value $V_{11}$. In a vehicle speed range from $V_{11}$ to a relatively high vehicle speed value $V_{12}$, control gain $KS_1$ decreases linearly with increase in vehicle speed V. In a range equal to or higher than vehicle speed value $V_{12}$, control gain $KS_1$ is set invariably equal to a relatively small value $K_{S1L}$ smaller than $K_{S1H}$.

At step S8 following step S7, control unit 10 modifies front wheel roll stiffness distribution Dp with roll stiffness distribution modification quantity ΔDp according to the following equation (5) and thereby determines a modified front wheel roll stiffness distribution (or distribution ratio) Dph.

$$Dph = Dp - \Delta Dp \quad (5)$$

At next step S9, control unit 10 modifies front pressure sum $P_{sF}$ and rear pressure sum $P_{sR}$ in accordance width modified front wheel roll stiffness distribution Dph, and thereby determines modified pressure sums $Psh_F$ and $Psh_R$ according to the following equation (6).

$$Psh_F = Dph \cdot (Ps_F + Ps_R)$$

$$Psh_R = (1 - Dph) \cdot (Ps_F + Ps_R) \quad (6)$$

At step S10, control unit 10 determines modified target fluid pressures Pahi by modifying target fluid pressures Pai in accordance with modified pressure sums $Psh_F$ and $Psh_R$ calculated at step S9, and a left and right distribution ratio of rolling control quantity corresponding to a turning condition calculated in the calculation of target fluid pressures Pai at step S4. Thus, modified fluid pressures Pahi are determined by dividing each of $Psh_F$ and $Psh_R$ according to the left and right distribution ratio based on the turning condition, and adding each portion to a corresponding one of the target fluid pressures Pai.

Thereafter, control unit 10 outputs a clutch control signal to engage clutch 17 at step S11, and produces a steering control signal to bring actual front wheel steer angle $δ_F$ of steering angle sensor 21, toward target front wheel steer angle δ*. This steering control signal is delivered to automatic steering motor 16. Moreover, control unit 10 produces and outputs control signals to achieve modified target fluid pressure Pahi, respectively in hydraulic cylinders 34. After step S12, control unit 10 returns to a main program.

When auto steer switch 24 is in an off state indicating the absence of command of the automatic steering mode, then control unit 10 proceeds from step S5 to step S16, and output clutch control signal to disengage clutch 17. Then, at next step S17, control unit 10 produces and outputs control signals to produce the target fluid pressures Pai in the hydraulic cylinders 34. Thereafter, control unit 10 returns to the main program.

Steering actuator (14~17) can serve as an actuator of an automatic steering section of the lane keeping apparatus. Operations of control unit 10 for controlling the steering actuator can serve as at least a part of means for automatically steering a vehicle for lane keeping. The active suspension system including hydraulic cylinders 34 can serve as an actuating system of a steering characteristic adjusting section of the lane keeping apparatus, and as a roll stiffness distribution control system. Operations of control unit 10 for controlling hydraulic cylinder 34 can serve as at least part of means for adjusting a steering characteristic of the vehicle.

The lane keeping apparatus according to the first embodiment is operated as follows.

When an ignition switch of the controlled vehicle is turned on, control unit 10 starts the procedure for the automatic steering control and the control for suppressing vehicle posture changes, and produces a steering assisting force corresponding to the steering torque of steering shaft 5 by driving steering assist motor 7 in accordance with steering torque T of steering torque sensor 12.

By processing the signal from camera 25, camera controller 26 calculates yaw angle $\Phi$ of the vehicle, side deviation y of the vehicle from the center of the lane, and curvature $\beta$ of the lane. These are outputted to control unit 10.

Control unit 10 collects input information on vehicle operating conditions and road conditions by receiving the information items from camera controller 26, and the information items from the various vehicle operating condition sensors (at step S1), calculates vehicle speed V by using the wheel speeds of wheel speed sensors 22FL~22RR (at step S2), and calculates the desired front wheel steer angle $\delta^*$ according to the equation (2) (at step S3). In accordance with normal accelerations Zgi, lateral acceleration Yg and longitudinal acceleration Xg, control unit 10 further calculates pitching control quantity, rolling control quantity and bouncing control quantity, and then calculates target fluid pressures Pai (i=FL~RR) in accordance with these control quantities.

When auto steer switch 24 is in the off state, control unit 10 disengages clutch 17 (at step S16) to disconnect automatic steering motor 16 from steering shaft 5, and brings the cylinder pressures of hydraulic cylinders 34 to the respective target fluid pressures Pai (at step S17).

By this control operation, this control system controls the cylinder pressures of hydraulic cylinders 34 to the target fluid pressures Pai to control the pitching motion, rolling motion and bouncing motion in a normal vehicle posture change suppressing control mode.

When auto steer switch 24 is turned on, control unit 10 calculates roll stiffness distribution Dp according to equation (3) (at step 56), further calculates roll stiffness distribution modification quantity $\Delta$Dp based on target front wheel steer angle $\delta^*$ (at step S7), and determines modified front wheel roll stiffness distribution Dph by modifying roll stiffness distribution Dp with modification quantity $\Delta$Dp (at step S8). Then, control unit 10 modifies target fluid pressures Pai by using modified distribution Dph (at steps S9 and S10).

The modification quantity $\Delta$Dp is increased as the target front wheel steer angle $\beta^*$ increases. Therefore, the modified front wheel roll stiffness distribution Dph (=Dp−$\Delta$Dp) is decreased as the target front wheel steer angle $\delta^*$ increases. Therefore, as shown in FIG. 4A, if the side deviation y of the controlled vehicle increases in the automatic steering mode in a straight ahead driving state, the target front wheel steer angle $\delta^*$ is increased in response to an increase in the side deviation. As a result, the control system of this embodiment improves the yawing response of the controlled vehicle by decreasing the roll stiffness distribution to the front wheels and increasing the roll stiffness distribution to the rear wheels. If the corrective control action to reduce the side deviation ends and hence the target front wheel steer angle $\delta^*$ becomes smaller, then the control system acts to improve the stability of the controlled vehicle by decreasing the roll stiffness distribution to the rear wheels.

When, from the straight driving operation, the vehicle comes into a turning condition as shown in FIG. 4B, the automatic steering control functions to steer the vehicle in accordance with target front wheel steer angle $\delta^*$. Upon transition from a straight ahead state to a turning state as shown at A, the control system modifies the front wheel roll stiffness distribution Dp in accordance with the target front wheel steer angle $\beta^*$, and thereby improves the yawing response of the controlled vehicle with the modification quantity in a direction to increase the roll stiffness distribution to the rear wheels.

When the vehicle deviates toward the inside of the turn and the side deviation y is to be reduced toward the outside of the turn as shown at B in FIG. 4B, the control system decreases the modification quantity $\Delta$Dp with a decrease in target front wheel steer angle $\delta^*$, and improves the straight running stability of the vehicle with the modification in a direction to increase the roll stiffness distribution to the front wheels. Thus, the control system can improve the yaw damping characteristic, and corrects the heading direction toward the outside of the turn with smooth behavior. At the end of the correction, target front wheel steer angle $\delta^*$ increases, and hence the roll stiffness distribution to the rear wheels is increased to improve the yawing response of the vehicle.

Control gain KS1 used in the calculation of the roll stiffness distribution modification quantity $\Delta$Dp is decreases as vehicle speed V becomes higher. Therefore, modification quantity $\Delta$Dp is suppressed to a lower level as vehicle speed V increases, and the distribution to the front wheels is set to a higher value. Thus, the control system can improve the stability of the vehicle at high vehicle speeds.

In this way, the control system improves the yawing response when target front wheel steer angle $\delta^*$ increases, and improves the straight ahead running stability when target front wheel steer angle $\delta^*$ decreases. Moreover, the steering amount required for correction after a transition to a straight ahead operation is smaller. Accordingly, the required steering torque for the automatic steering control is smaller, and the load on the automatic steering mechanism inclusive of automatic steering motor 16 can be decreased. This embodiment makes it possible to reduce the size of the automatic steering mechanism, to decrease the required output thereof, and to improve the response of the automatic steering control.

It is optional to further employ an ABS system (or antilock brake control system). Control unit 10 may be arranged to carry out control operations of the ABS system. In this case, it is possible to use the vehicle speed calculated in the process of the ABS control instead of the calculation of step S2 based on the wheel speeds.

In the first embodiment, the roll stiffness distribution modification quantity $\Delta$Dp is determined in accordance with target front wheel steer angle $\delta^*$. It is possible to determine the roll stiffness distribution modification quantity $\Delta$Dp in accordance with some other parameter indicative of the steering behavior or yawing motion of the controlled vehicle. For example, it is optional to calculate the roll stiffness distribution modification quantity in accordance with a variation (or variation quantity) $\Delta\delta^*$ of target front wheel steer angle $\delta^*$. Moreover, it is optional to employ a yaw rate sensor for sensing an actual yaw rate $\phi$ of the vehicle, and to arrange the control system to calculate a target yaw rate $\phi_{REF}$ from the actual front wheel steer angle $\delta_F$ and vehicle speed V, to determine whether the yaw rate of the vehicle is in a converging direction (or settling direction) or not, by examining target yaw rate $\phi_{REF}$ and actual yaw rate $\phi$.

Instead of the active suspension system, it is optional to employ a system having actuators capable of varying vibration damping forces of dampers in a continuous stepless manner or in a stepped manner, and to vary the roll stiffness distribution by varying the magnitudes of the damping force on the front and rear sides.

FIGS. 5A, 5B, 6, and 7 show a lane keeping apparatus or control system according to a second embodiment of the present invention. In the second embodiment, a controlled vehicle is equipped with a front and rear driving force distribution control system as a steering characteristic adjusting system or a second actuating system, and the lane keeping apparatus is arranged to adjust the steering characteristic by controlling the front and rear driving force distribution.

A transfer 43 divides the output of an engine 41 after the speed change operation of a transmission 42 at a selected gear ratio, into a portion for the front drive axle's side and a portion for the rear drive axle's side. The front driving force taken out by transfer 43 is transmitted to front wheels 1FL and 1FR through a front output shaft 44, a front differential gear 45, and front wheel drive shafts 46. The rear driving force is transmitted from transfer 43 to rear wheels 1RL and 1RR through a propeller shaft 47, a rear differential gear 48 and rear wheel drive shafts 49.

A multiple disk clutch 43a of a hydraulic type is disposed in transfer 43. This transfer clutch 43a can vary the torque distribution between the front and rear wheels under the control of a clutch control fluid pressure supplied from a hydraulic unit 50. Hydraulic unit 50 of this example includes a fluid pressure source 50a for receiving an operating oil from an oil reservoir and supplying the operating oil under pressure, and a pressure control valve 50b for regulating the pressure of the operating oil supplied from pressure source 50a, and supplies the oil at the regulated fluid pressure to transfer clutch 43a. Pressure control valve 50b is controlled by control unit 10.

Sensors are; wheel speed sensors 22FL~22RR, a lateral acceleration sensor 38, and a yaw rate sensor 42 for sensing an actual yaw rate φ of the controlled vehicle. There are further provided, as in the first embodiment, auto steer switch 24, camera 25, camera controller 26 and steering mechanism 30. Signals are sent from the various input devices including the sensors and switch to control unit 10. Control unit 10 controls steering mechanism 30 and hydraulic unit 50.

In accordance with the input information supplied from the sensors, control unit 10 produces a steering assist force corresponding to a steering torque T produced in steering shaft 5 by driving steering assist motor 7, and performs the automatic steering control as in the first embodiment. Moreover, in accordance with the input information, control unit 10 determines a target front and rear driving force distribution as in a conventional driving force distribution control system, and controls the front and rear driving force distribution by controlling transfer clutch 43a with hydraulic unit 50 so as to achieve the target. Moreover, control unit 10 functions to increase a rear driving force to the rear drive wheels when the steerable wheels are to be steered by the automatic steering control procedure in a direction away from the neutral straight ahead position, and to decrease the rear driving force to the rear drive wheels when the steerable wheels are to be steered by the automatic steering control procedure in a direction toward the neutral position.

Figure 6:
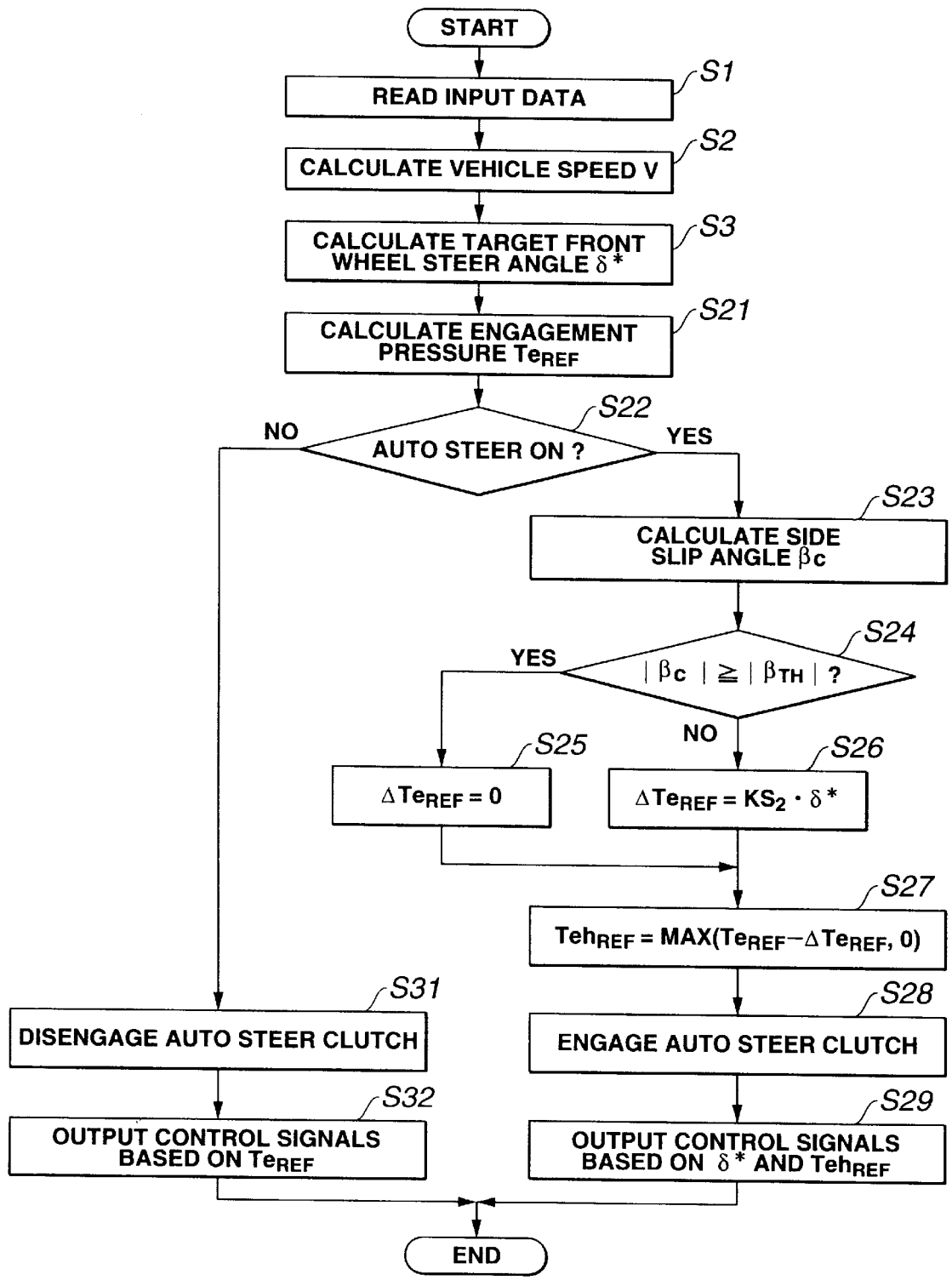
FIG. 6 is a flowchart of a control procedure performed by the lane keeping system of the second embodiment.

FIG. 6 shows a control procedure which control unit 10 performs for the automatic steering control and the driving force distribution control. This control procedure is executed as timer interrupt routine at regular time intervals of a predetermined sampling time, for example 10 msec.

At step S1, as in the first embodiment, control unit 10 reads signals of the sensors and other input devices to collect the input information. In the second embodiment, control unit 10 reads actual front wheel steer angle $\delta_F$ of steering angle sensor 21, wheel speeds of wheel speed sensors 22FL~22RR, switch signal of auto steer switch 24, lateral acceleration Yg of lateral acceleration sensor 38, and actual yaw rate φ of yaw rate sensor 26. Control unit 10 further obtains vehicle yaw angle Φ, vehicle side deviation y and lane curvature β detected by camera controller 26.

Then, control unit 10 determines a vehicle speed V according to the equation (1) at step S2, and further determines target front wheel steer angle δ* according to the equation (2) at step S3.

At next step S21 following step S3, control unit 10 determines target transfer clutch engagement pressure $Te_{REF}$ representing a target front wheel driving force. In this example, target transfer clutch engagement pressure $Te_{REF}$ corresponding to the target front wheel driving force is determined in accordance with a front and rear wheel speed difference ΔVw between a front wheel speed and a rear wheel speed calculated from the signals of wheel speed sensors 22FL~22RR, and lateral acceleration Yg as in a known front and rear driving force distribution control system.

In this example, target transfer clutch engagement pressure $Te_{REF}$ is determined in accordance with front and rear wheel speed difference ΔVw and lateral acceleration Yg. However, the present invention is not limited to this. It is optional to employ various other operating conditions for determining target transfer clutch engagement pressure $Te_{REF}$. For example, target transfer clutch engagement pressure $Te_{REF}$ may be determined in consideration of a sensed accelerator opening degree of an accelerator pedal and/or sensed longitudinal acceleration of the controlled vehicle.

At step S22 following step S21, control unit 10 examines whether auto steer switch 24 is in the on state or not, by examining the switch signal from auto steer switch 24. When auto steer switch 24 is in the on state to command the automatic steering mode, then control unit 10 proceeds from step S22 to step S23.

At step S23, control unit 10 calculates a vehicle side slip angle βc from actual yaw rate φ, lateral acceleration Yg and vehicle speed V according to the following equation (7).

$$\beta c = Yg - V \cdot \phi \tag{7}$$

At decision step S24 following step S23, control unit 10 examines whether the absolute value of calculated side slip angle βc is greater than or equal to a threshold value $|\beta_{TH}|$ or not. (Step S24 serves as means for sensing a vehicle behavior.) When the absolute value of vehicle side slip angle βc is equal to or greater than threshold $\beta_{TH}$ ($|\beta c| \geq |\beta_{TH}|$), control unit 10 proceeds from step S24 to step S25, and sets a transfer clutch engagement pressure modification quantity $\Delta Te_{REF}$ to zero ($\Delta Te_{REF} = 0$).

When the absolute value of vehicle side slip angle $|\beta c|$ is smaller than threshold $|\beta_{TH}|$ ($|\beta c| < |\beta_{TH}|$), control unit 10 proceeds from step S24 to step S26, and calculates the transfer clutch engagement pressure modification quantity $\Delta Te_{REF}$ according to the following equation (8).

$$\Delta Te_{REF} = KS_2 \cdot |\delta^*| \tag{8}$$

Figure 7:
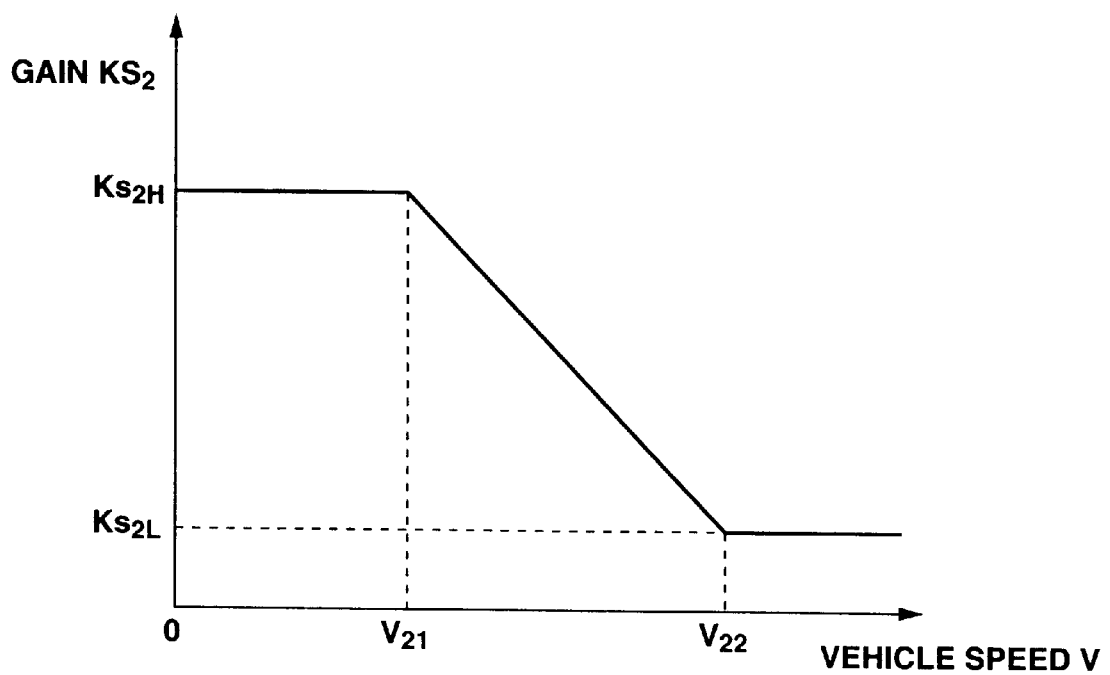
FIG. 7 is a graph showing a characteristic of a control gain $KS_2$ in the lane keeping system of the second embodiment.
Figure 8A:
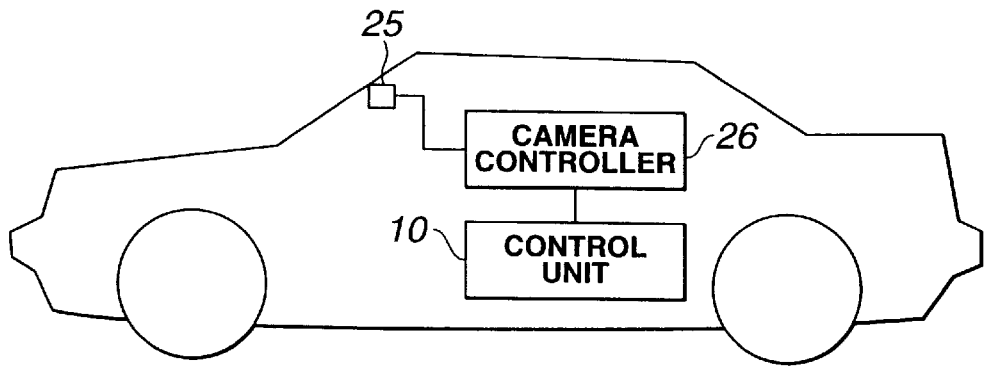
FIG. 8A is a schematic view showing a vehicle equipped with a lane keeping system according to a third embodiment of the present invention.
Figure 8B:
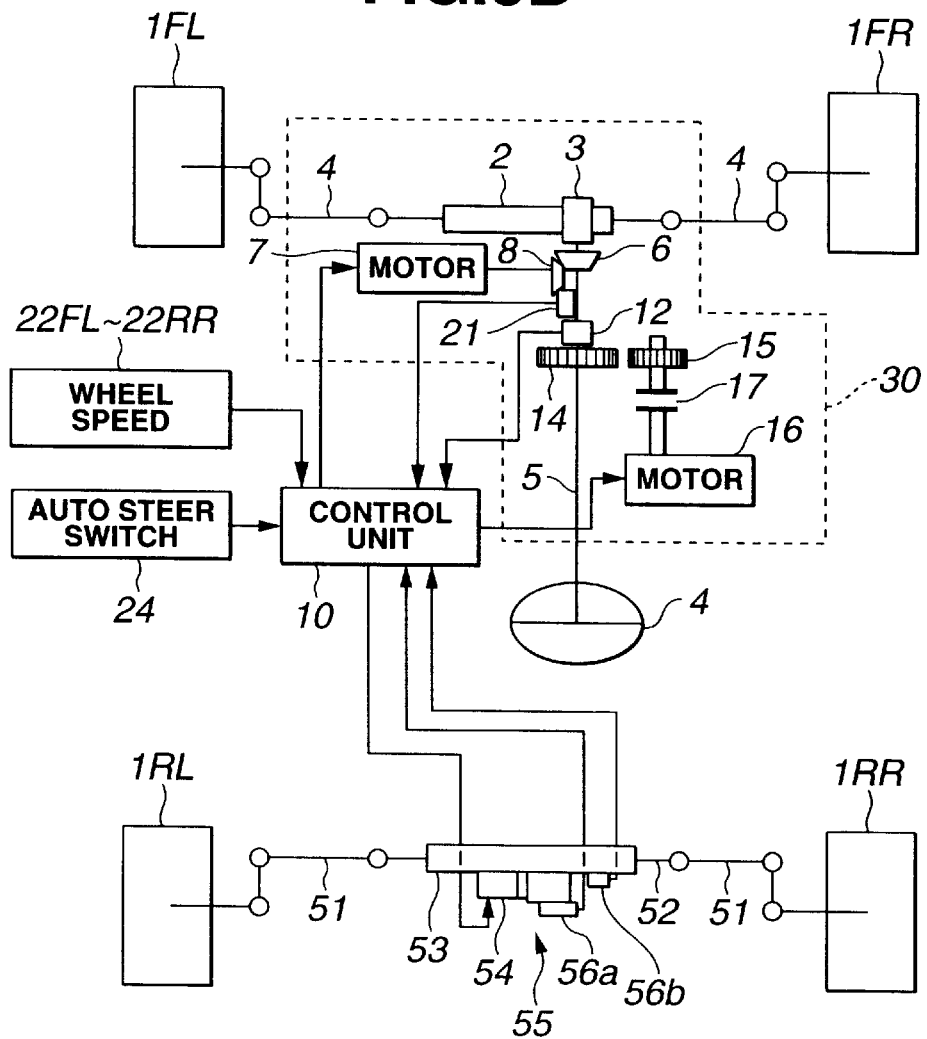
FIG. 8B is a schematic view showing the lane keeping system according to the third embodiment.

In this equation, $KS_2$ is a control gain varying in dependence on vehicle speed V. In this example, control gain $KS_2$ decreases monotonically with increase in vehicle speed V as shown in FIG. 7. Control gain $KS_2$ is set invariably equal to a relatively large value $KS_{2H}$ in a low vehicle speed range from zero to a medium vehicle speed value $V_{21}$. In a vehicle speed range from $V_{21}$ to a relatively high vehicle speed value $V_{22}$, control gain $KS_2$ decreases linearly with increase in vehicle speed V. In a range equal to or higher than vehicle speed value $V_{22}$, control gain $KS_2$ is set invariably equal to a relatively small value $KS_{2L}$.

At step S27 following step S25 or S26, control unit 10 modifies the target transfer clutch engagement pressure $Te_{REF}$ with modification quantity $\Delta Te_{REF}$ determined at step S25 or S26, according to the following equation (9) and thereby determines a modified transfer clutch engagement pressure $Teh_{REF}$.

$$Teh_{REF} = MAX(Te_{REF} - \Delta Te_{REF}, 0) \qquad (9)$$

By using the equation (9), a greater one of $Te_{REF} - \Delta Te_{REF}$ and zero is selected as $Teh_{REF}$. Modified transfer clutch engagement pressure $Teh_{REF}$ is set equal to $Te_{REF} - \Delta Te_{REF}$ as long as $Te_{REF} - \Delta Te_{REF}$ is greater than zero.

Thereafter, control unit 10 outputs a clutch control signal to engage clutch 17 at step S28, and produces a steering control signal to bring actual front wheel steer angle $\delta_F$ of steering angle sensor 21, toward target front wheel steer angle $\delta^*$ at step S29. This steering control signal is delivered to automatic steering motor 16. Moreover, at step S29, control unit 10 produces a driving force distribution control signal to achieve the modified transfer clutch engagement pressure $Teh_{REF}$, and outputs this control signal to hydraulic unit 50. After step S29, control unit 10 returns to a main program.

When auto steer switch 24 is in an off state indicating the absence of command of the automatic steering mode, then control unit 10 proceeds from step S22 to step S31, and outputs clutch control signal to disengage clutch 17. Then, at next step S32, control unit 10 produces a control signal to produce the target transfer clutch engagement pressure $Te_{REF}$, and outputs this control signal to hydraulic unit 50. Thereafter, control unit 10 returns to the main program.

The lane keeping apparatus according to the second embodiment is operated as follows.

When an ignition switch of the controlled vehicle is turned on, control unit 10 starts the procedure for the automatic steering control and the front and rear driving force distribution control. By processing the signal from camera 25, camera controller 26 calculates vehicle yaw angle Φ, vehicle side deviation y from the center of the lane, and lane curvature β. These are outputted to control unit 10.

Control unit 10 receives the information items from camera controller 26, and the information items from the various vehicle operating condition sensors, calculates vehicle speed V from the wheel speeds of wheel speed sensors 22FL~22RR, and calculates the desired front wheel steer angle $\delta^*$ (at step S1~S3). In accordance with the front and rear wheel speed difference $\Delta Vw$ calculated from the sensed front and rear wheel speeds, and lateral acceleration Yg, control unit 10 further calculates target transfer clutch engagement pressure $Te_{REF}$ for transfer clutch 43a (at step 521).

When auto steer switch 24 is in the off state, control unit 10 disengages clutch 17 (at step S31) to disconnect automatic steering motor 16 from steering shaft 5, and outputs the driving force distribution control signal to produce the transfer clutch engagement pressure $Te_{REF}$, to hydraulic unit 50 (at step S32).

In response to this driving force distribution control signal, pressure control valve 50b of hydraulic unit 50 varies the fluid pressure to transfer clutch 43a, and transfer 43 achieves the front and rear driving force distribution as commanded by the target value $Te_{REF}$. Thus, the control system controls the front and rear wheel driving force distribution in a normal control mode when auto steer switch 24 is off.

When auto steer switch 24 is turned on, control unit 10 calculates vehicle side slip angle βc according to equation (7) (by taking a course from step S22 to step S23).

When vehicle side slip angle βc is small and $|\beta c| < |\beta_{TH}|$, then transfer clutch engagement pressure modification quantity $\Delta Te_{REF}$ is calculated according to equation (8) at step S26. Therefore, as target front wheel steer angle $\delta^*$ becomes greater, the transfer clutch engagement pressure modification quantity $\Delta Te_{REF}$ is increased, and hence the modified engagement pressure $Teh_{REF}$ is decreased (at step S27). Thus, this control system decreases the proportion of the driving force allotted to the front wheels when target front wheel steer angle $\delta^*$ is great (at step S29).

Therefore, as shown in FIG. 4A, if the side deviation y of the controlled vehicle increases in the automatic steering mode in a straight ahead driving state, the target front wheel steer angle $\delta^*$ is increased in response to an increase in the side deviation. As a result, the control system of this embodiment improves the yawing response of the controlled vehicle by decreasing the transfer clutch engagement pressure and thereby increasing the driving force distribution to the rear wheels. If the corrective control action to reduce the side deviation ends and hence the target front wheel steer angle $\delta^*$ becomes smaller, then the control system acts to improve the running stability of the controlled vehicle by increasing the driving force distribution to the front wheels.

When, from the straight driving operation, the vehicle comes into a cornering operation as shown in FIG. 4B, target front wheel steer angle $\delta^*$ is increased by the automatic steering system. Therefore, the control system modifies the transfer clutch engagement pressure in a direction to decrease the clutch engagement force in accordance with the target front wheel steer angle $\delta^*$, and thereby improves the yawing response of the controlled vehicle by increasing the driving force distribution to the rear wheels.

When the vehicle deviates toward the inside of the turn and the side deviation y is to be reduced toward the outside of the turn as shown at B in FIG. 4B, the control system decreases the modification quantity ATeREF with a decrease in target front wheel steer angle $\delta^*$, and improves the straight running stability of the controlled vehicle with the modification in a direction to increase the driving force distribution to the front wheels. The automatic steering system can correct the course of the vehicle smoothly toward the outside of the turn.

Control gain KS2 used in the calculation of the transfer clutch engagement pressure modification quantity $\Delta Te_{REF}$ is decreased as vehicle speed V becomes higher. Therefore, modification quantity $\Delta Te_{REF}$ is suppressed to a lower level as vehicle speed V increases, and the driving force distribution to the front wheels is set to a higher value. Thus, the control system can improve the stability of the controlled vehicle at high vehicle speeds.

When the absolute value of calculated side slip angle βc is greater than or equal to the threshold value $|\beta_{TH}|$ ($|\beta c| \geq |\beta_{TH}|$), the transfer clutch engagement pressure modification quantity $\Delta Te_{REF}$ is set equal to zero at step S25, so that the transfer clutch engagement pressure $Te_{REF}$ remains unmodified. Thus, the control system according to the second embodiment monitors the vehicle behavior by checking a vehicle turning motion variable which, in this example, is the vehicle side slip angle βc, and refrains from the adjustment of the steering characteristic based on target front wheel steer angle $\delta^*$ when a decrease in the running stability is predicted. Thus, by disabling the modification of the driving force distribution in the direction to improve the yawing response of the vehicle, the control system can prevent the steering characteristic from being adjusted overly in the direction to improve the yawing response by the combination of the automatic steering control based on target front wheel steer angle δ* and the steering characteristic adjustment with the driving force distribution control, and adequately protect the stability of the vehicle from being decreased by road conditions.

In this way, the lane keeping apparatus or control system according to the second embodiment can provide advantageous effects as in the first embodiment.

In the second embodiment, the transfer clutch engagement pressure modification quantity $\Delta Te_{REF}$ is determined in accordance with target front wheel steer angle δ*. It is possible to determine the transfer clutch engagement pressure modification quantity $\Delta Te_{REF}$ in accordance with some other parameter indicative of the steering amount or yawing motion by the automatic steering system. For example, it is optional to calculate a target yaw rate $\phi_{REF}$ from the actual front wheel steer angle $\delta_F$ and vehicle speed V, to examine whether the yaw rate of the vehicle is in a converging direction (or settling direction) or not, by examining target yaw rate $\phi_{REF}$ and sensed actual yaw rate φ, and to calculate the modification quantity $\Delta Te_{REF}$ in dependence on the result of the examination.

Figure 5A:
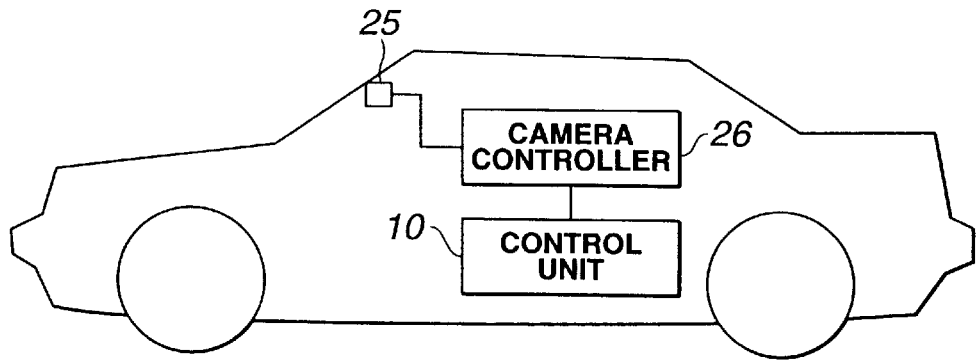
FIG. 5A is a schematic view showing a vehicle equipped with a lane keeping system according to a second embodiment of the present invention.
Figure 5B:
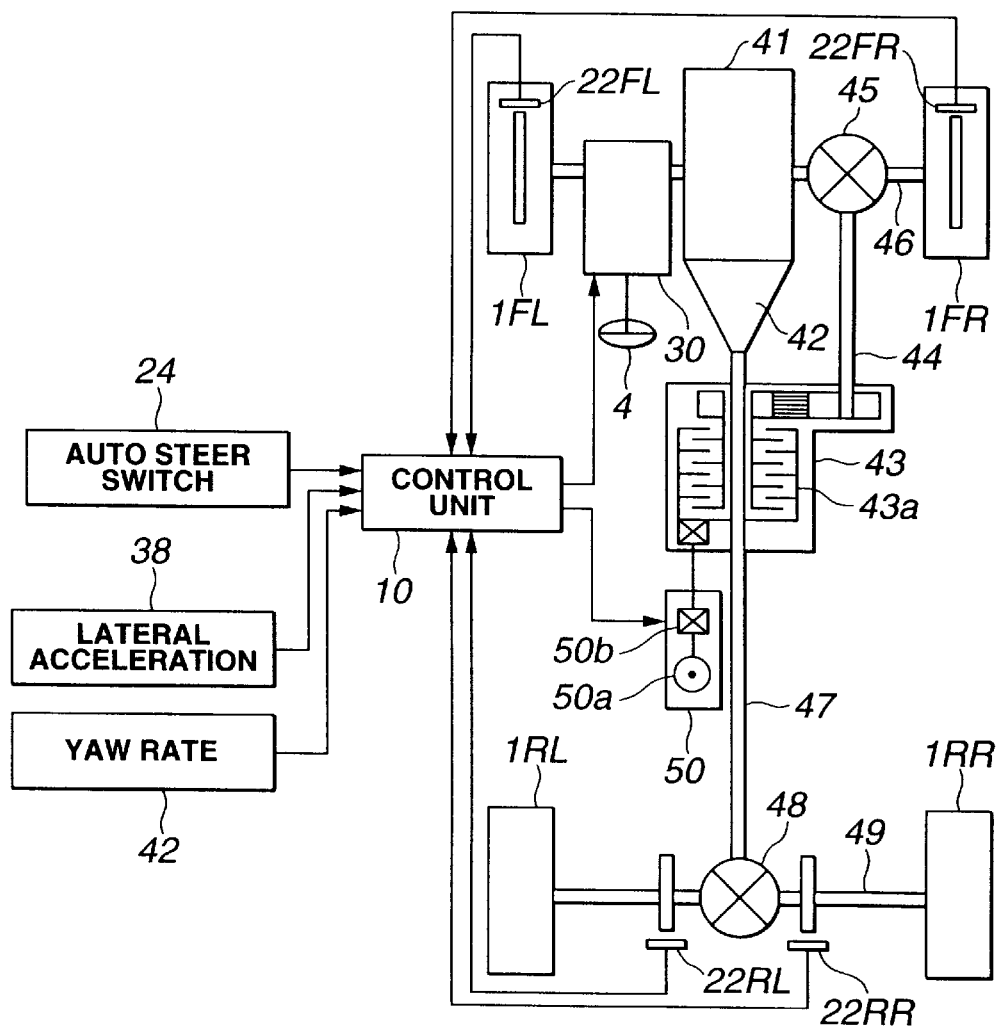
FIG. 5B is a schematic view showing the lane keeping system according to the second embodiment.

The four wheel drive system shown in FIGS. 5A and 5B employs the transfer 43 capable of varying the front and rear driving force distribution continuously. However, it is possible to employ a four wheel drive system having an actuator for switching between a 2WD mode and a 4WD mode in a manner of on-off control, and a four wheel drive system for controlling the front and rear driving force distribution in a stepped manner having a plurality of discrete distribution ratios.

FIGS. 8A, 8B, 9 and 10 show a lane keeping apparatus or control system according to a third embodiment of the present invention. In the third embodiment, a controlled vehicle is equipped with a four wheel steering system as a steering characteristic adjusting system or a second actuating system, and the lane keeping apparatus is arranged to adjust the steering characteristic by varying a manipulated variable in the form of the steer angle of the rear wheels.

Front wheels 1FL and 1FR are primary steerable wheels of the controlled vehicle. Rear wheels 1RL and 1RR are secondary steerable wheels. Between front wheels 1FL and 1FR, there is provided a front wheel steering mechanism 30 through tie rods 4 as in the preceding embodiments.

A rear wheel steering mechanism 55 is disposed between rear wheels 1RL and 1RR. A steering shaft 52 is interposed between rear wheels 1RL and 1RR via rear tie rods 51. An actuator unit 53 of the rear wheel steering mechanism 55 is arranged to move the steering shaft 52 left and right and thereby to steer rear wheels 1RL and 1RR. This actuator unit 53 uses an electric motor 54 as a power source, and forms the rear wheel steering mechanism 55 of a known type. Rear wheel steering mechanism 55 can steer rear wheels 1RL and 1RR in leftward or rightward direction by moving steering shaft 52 in the left and right direction of the vehicle by driving motor 54 in one direction or the opposite direction. In the rear wheel steering mechanism 55, there are provided rear wheel steer angle sensing units 56a and 56b for sensing rear wheel steer angles $\theta_R$ of rear wheels 1RL and 1RR. The signals of rear wheel steer angle sensing units 56a and 56b are supplied to control unit 1.

There are provided, as in the preceding embodiments, wheel speed sensors 22FL~22RR, auto steer switch 24, camera 25 and camera controller 26. Signals are sent from these input devices to control unit 10. Control unit 10 controls front steering mechanism 30, and actuator unit 53 of rear steering mechanism 55.

In accordance with the input information supplied from the sensors, control unit 10 produces a steering assist force, and performs the automatic steering control as in the first embodiment. Moreover, in accordance with the input information, control unit 10 controls rear steering mechanism 55 to steer rear wheels 1RL and 1RR in an in-phase direction identical in phase with a steering operation of front wheels 1FL and 1FR with steering wheel 4 or in an opposite-phase direction opposite in phase to the front wheel steering direction, like a conventional four wheel steering system. In the medium vehicle speed region, for example, the control system varies the steering characteristic toward weak understeer and thereby improve the cornering performance of the controlled vehicle by the in-phase rear wheel steering operation. In a high vehicle speed region, the control system increases the tendency to understeer. By so doing, the control system improves the stability during cornering or lane changing, and provide a smoothly settling cornering behavior. Moreover, control unit 10 functions to decrease an in-phase steering amount of the rear wheels or to increase an opposite phase steering amount of the rear wheels when the steerable wheels are to be steered by the automatic steering control procedure in a direction away from the neutral straight ahead position. When the steerable wheels are to be steered by the automatic steering control procedure in a direction toward the straight ahead neutral position, control unit 10 functions to increase the in-phase rear wheel steering amount or decrease the opposite-phase rear wheel steering amount.

Figure 9:
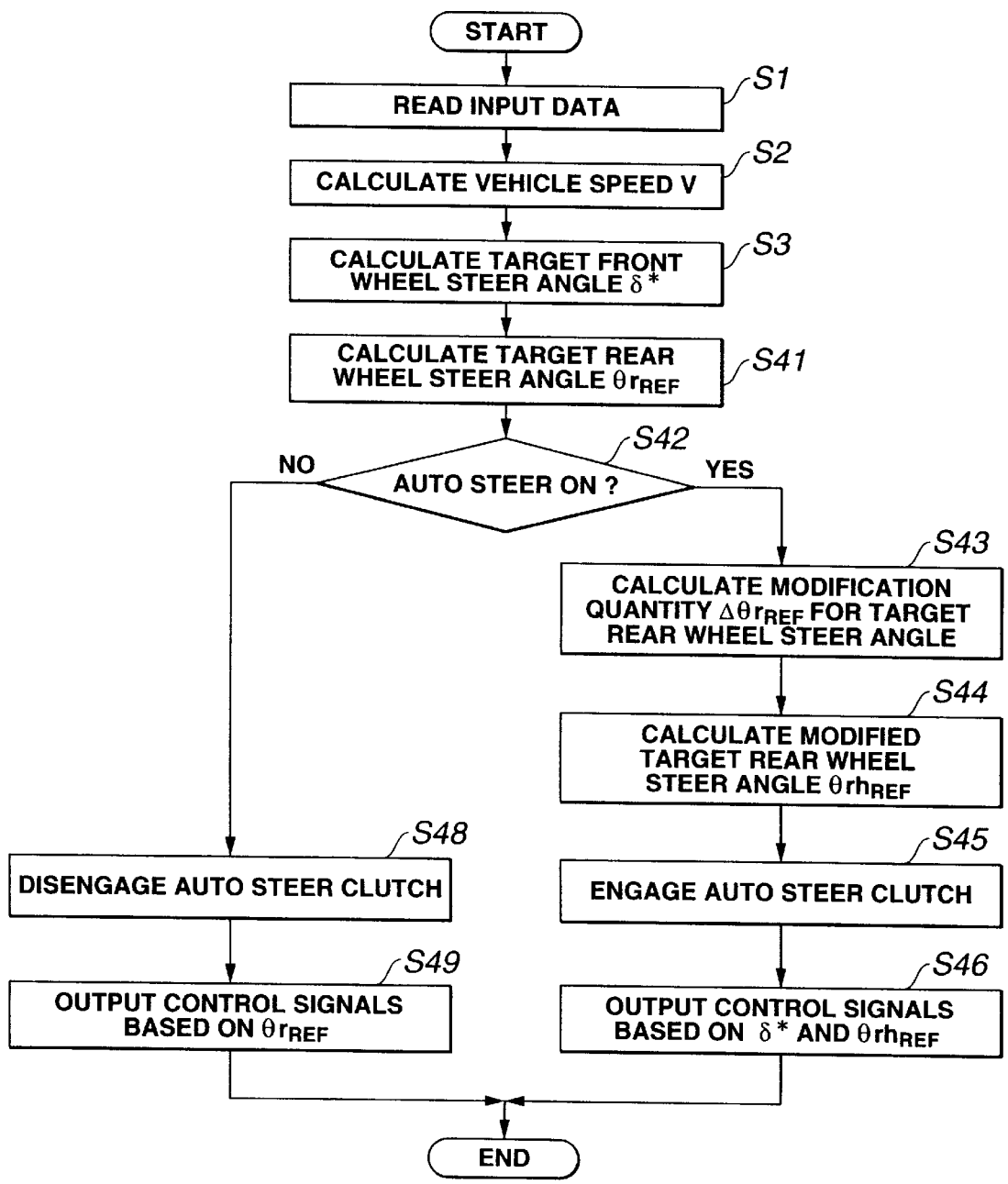
FIG. 9 is a flowchart of a control procedure performed by the lane keeping system of the third embodiment.

FIG. 9 shows a control procedure which control unit 10 performs for the automatic steering control and the rear wheel steer angle control. This control procedure is executed as timer interrupt routine at regular time intervals of a predetermined sampling time, for example 10 msec.

At step S1, as in the preceding embodiments, control unit 10 reads signals of the sensors. In the third embodiment, control unit 10 reads actual front wheel steer angle $\delta_F$ of steering angle sensor 21, wheel speeds of wheel speed sensors 22FL~22RR, switch signal of auto steer switch 24 and rear wheel steer angles $\theta_R$ of rear wheel steer angle sensing units 56a and 56b. Control unit 10 further obtains yaw angle Φ, side deviation y from the center of the lane and curvature β of the lane detected by camera controller 26. In this example, control unit 10 monitors the signals of the two rear wheel steer angle sensing units 56a and 56b and detects an abnormal condition by comparing the values of the rear wheel steer angle sensed by the sensing units 56a and 56b.

Then, control unit 10 determines a vehicle speed V at step S2, and further determines target front wheel steer angle δ* at step S3 as in the preceding embodiments.

At next step S41 following step S3, control unit 10 determines target rear wheel steer angle $\theta r_{REF}$ as in a rear wheel steer angle control of a known type. For example, target rear wheel steer angle $\theta r_{REF}$ is determined in accordance with the actual front wheel steer angle $\delta_F$ sensed by steering angle sensor 21, a steering angular speed $\delta_F'$ calculated from actual front wheel steer angle $\delta_F$, and vehicle speed V.

This example employs, as parameters used to calculate target rear wheel steer angle $\theta r_{REF}$, the actual front wheel steer angle $\delta_F$, steering angular speed $\delta_F'$ calculated from actual front wheel steer angle $\delta_F$, and vehicle speed V. However, the present invention is not limited to this arrangement. It is optional to employ various other operating conditions for determining target rear wheel steer angle $\theta r_{REF}$. For example, target rear wheel steer angle $\theta r_{REF}$ may be determined in consideration of actual lateral acceleration of the controlled vehicle sensed by a sensor.

At step S42 following step S41, control unit 10 examines whether auto steer switch 24 is on or not, by examining the switch signal from auto steer switch 24. When auto steer switch 24 is in the on state to command the automatic steering mode, then control unit 10 proceeds from step S42 to step S43.

At step S43, control unit 10 calculates a target rear wheel steer angle modification quantity $\Delta\theta r_{REF}$ according to the following equation (10).

$$\Delta\theta r_{REF} = KS_3 \cdot \delta^* \quad (10)$$

Figure 10:
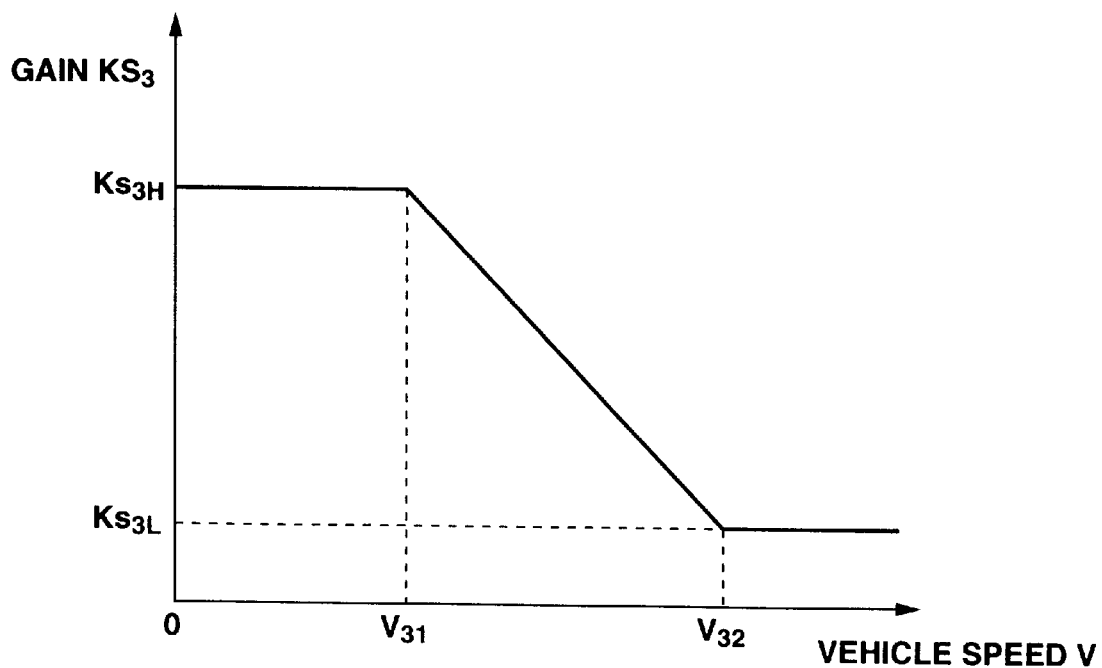
FIG. 10 is a graph showing a characteristic of a control gain $KS_3$ in the lane keeping system of the third embodiment.

In this equation, $KS_3$ is a control gain varying in dependence on vehicle speed V. In this example, control gain $KS_3$ decreases monotonically with increase in vehicle speed V as shown in FIG. 10. Control gain $KS_3$ is set invariably equal to a relatively large value $KS_{3H}$ in a low vehicle speed range from zero to a medium vehicle speed value $V_{31}$. In a vehicle speed range from $V_{31}$ to a relatively high vehicle speed value $V_{32}$, control gain $KS_3$ decreases linearly with increase in vehicle speed V. In a range equal to or higher than vehicle speed value $V_{32}$, control gain KS3 is set invariably equal to a relatively small value $KS_{3L}$.

At step S44 following step S43, control unit 10 modifies the target rear wheel steer angle $\theta r_{REF}$ with modification quantity $\Delta\theta r_{REF}$ determined at step S43, according to the following equation (11) and thereby determines a modified target rear wheel steer angle $\theta rh_{REF}$.

$$\theta rh_{REF} = \theta r_{REF} - \Delta\theta r_{REF} \quad (11)$$

Thereafter, control unit 10 outputs a clutch control signal to engage clutch 17 at step S45, and produces a steering control signal to bring actual front wheel steer angle $\delta_F$ toward target front wheel steer angle $\delta^*$ at step S46. This steering control signal is delivered to automatic steering motor 16. Moreover, at step S46, control unit 10 produces a rear wheel steer angle control signal to achieve the modified target rear wheel steer angle $\theta rh_{REF}$, and outputs this control signal to rear wheel steering actuator unit 53. After step S46, control unit 10 returns to a main program.

When auto steer switch 24 is in the off state indicating the absence of command of the automatic steering mode, then control unit 10 proceeds from step 542 to step S48, and output clutch control signal to disengage clutch 17. Then, at next step S49, control unit 10 produces a rear wheel steer angle control signal to make the actual rear wheel steer angle equal to target rear wheel steer angle $\theta r_{REF}$ determined at step S41. In this case, control unit 10 uses, as the actual rear wheel steer angle, the rear wheel steer angle sensed by the rear wheel steer angle sensing unit 56a, for example. This control signal is outputted to rear wheel steering actuator unit 53. Thereafter, control unit 10 returns to the main program.

In the absence of the command for the automatic steering, step S49 is reached through steps S1~S3, S41, S42 and S48, rear wheel steering actuator unit 53 receives the control signal to reduce a deviation of actual rear wheel steer angle $\theta r$ of rear wheel steer angle sensing unit 56a, from target rear wheel steer angle $\theta r_{REF}$, and drives electric motor 54 to steer rear wheels 1RL and 1RR. Thus, this control system controls the rear wheel steer angle in accordance with target front wheel steer angle $\delta^*$ in the normal rear wheel steering mode.

When auto steer switch 24 is turned on, step S43 is reached, and the modification quantity $\Delta\theta_{REF}$ is determined by using equation (10). Therefore, as target front wheel steer angle $\delta^*$ increases, target rear wheel steer angle modification quantity $\Delta\theta r_{REF}$ is increased, and hence the modified target rear wheel steer angle $\theta rh_{REF}$ ($=\theta r_{REF}-\Delta\theta r_{REF}$) is decreased (step S44). Thus, this control system functions to improve the yawing response or yawing characteristic of the controlled vehicle by decreasing the rear wheel steering amount in the in-phase direction or increasing the rear wheel steering amount in the opposite-phase direction. When target front wheel steer angle $\delta^*$ decreases, the control system functions to improve the stability of the controlled vehicle by increasing the rear wheel steering amount in the in-phase direction or decreasing the rear wheel steering amount in the opposite-phase direction.

Therefore, as shown in FIG. 4A, if the side deviation y of the vehicle increases in the automatic steering mode in a straight ahead driving state, the target front wheel steer angle $\delta^*$ is increased. As a result, the control system of this embodiment improves the yawing response of the vehicle by decreasing the rear wheel steering amount of modified target rear wheel steer angle $\theta rh_{REF}$ in the in-phase direction, or increasing the rear wheel steering amount of modified target rear wheel steer angle $\theta rh_{REF}$ in the opposite-phase direction. If the corrective control action to reduce the side deviation ends and hence the target front wheel steer angle $\delta^*$ becomes smaller, then the control system acts to improve the running stability of the controlled vehicle by increasing the rear wheel steering amount of modified target rear wheel steer angle $\theta rh_{REF}$ in the in-phase direction or decreasing the rear wheel steering amount of modified target rear wheel steer angle $\theta rh_{REF}$ in the opposite-phase direction.

When, from the straight driving operation, the vehicle comes into a cornering operation as shown in FIG. 4B, target front wheel steer angle $\delta^*$ is increased by the automatic steering system. Therefore, the control system varies the target rear wheel steer angle $\theta rh_{REF}$ in the direction to decrease target rear wheel steer angle $\theta rh_{REF}$ if target rear wheel steer angle $\theta rh_{REF}$ is in the in-phase direction, and in the direction to increase target rear wheel steer angle $\theta rh_{REF}$ if target rear wheel steer angle $\theta rh_{REF}$ is in the opposite-phase direction, and thereby improves the yawing response of the controlled vehicle.

When target front wheel steer angle $\delta^*$ decreases to correct the side deviation y toward the inside of the turn, the control system varies the target rear wheel steer angle $\theta rh_{REF}$ in the direction to increase target rear wheel steer angle $\theta rh_{REF}$ if target rear wheel steer angle $\theta rh_{REF}$ is in the in-phase direction, and in the direction to decrease target rear wheel steer angle $\theta rh_{REF}$ if target rear wheel steer angle $\theta rh_{REF}$ is in the opposite-phase direction, and thereby improves the straight ahead running stability of the controlled vehicle.

Control gain $KS_3$ used in the calculation of the rear wheel steer angle modification quantity $\Delta\theta r_{REF}$ is decreased as vehicle speed V becomes higher. Therefore, modification quantity $\Delta\theta r_{REF}$ is suppressed to a lower level as vehicle speed V increases, and the rear wheel steer angle is set to a higher value in the case of the in-phase operation and to a lower value in the case of the opposite-phase operation. Thus, the control system can improve the stability of the controlled vehicle at high vehicle speeds.

In this way, the lane keeping apparatus or lane keep control system according to the third embodiment can provide advantageous effects as in the first embodiment.

In the third embodiment, the rear wheel steer angle modification quantity $\Delta\theta r_{REF}$ is determined in accordance with target front wheel steer angle $\delta^*$. It is possible to determine the rear wheel steer angle modification quantity $\Delta\theta r_{REF}$ in accordance with some other parameter indicative of the steering behavior or yawing motion of the controlled vehicle. For example, it is optional to calculate a target yaw rate $\phi_{REF}$ from the actual front wheel steer angle $\delta_F$ and vehicle speed V, to examine whether the yaw rate of the vehicle is in a converging direction (or settling direction) or not, by examining target yaw rate $\phi_{REF}$ and sensed actual yaw rate $\phi$, and to calculate the rear wheel steer angle modification quantity $\Delta\theta r_{REF}$ in dependence on the result of the examination.

Moreover, it is possible to employ, as mechanism for adjusting the steering characteristic of the controlled vehicle, a combination of the four wheel steering system according to the third embodiment and the active suspension system according to the first embodiment, a combination of the four wheel steering system of the third embodiment and the driving force distribution control system according to the second embodiment or a combination of these three. In this case, the control system can be arranged to monitor the sensed lateral acceleration of the controlled vehicle as vehicle operating condition indicative of the degree of turn, and to select a more effective one of the actuating systems of the combination in accordance with the lateral acceleration.

Figure 11:
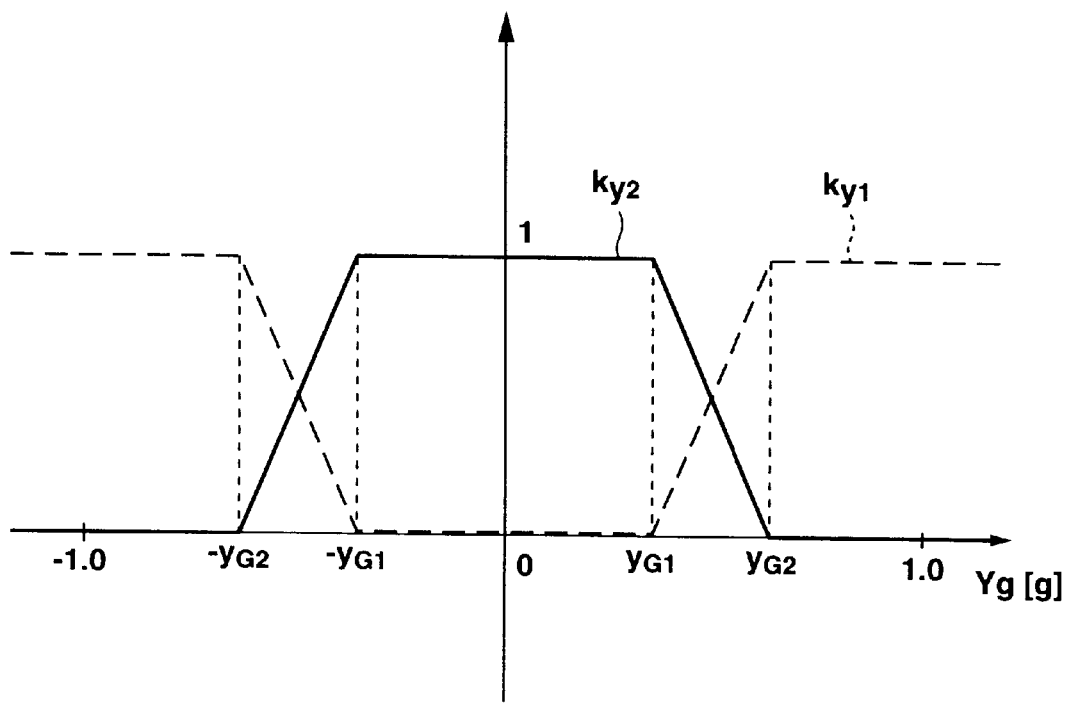
FIG. 11 is a graph showing characteristics of control gains $Ky_1$ and $Ky_2$ used in a modification of the third embodiment.
Figure 12A:
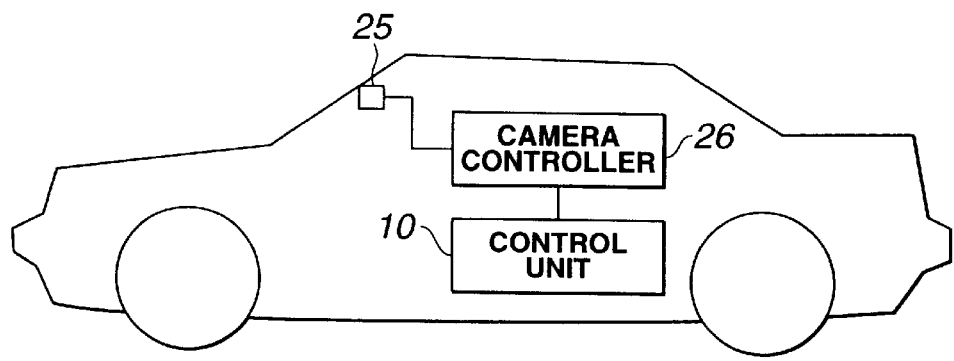
FIG. 12A is a schematic view showing a vehicle equipped with a lane keeping system according to a fourth embodiment of the present invention.
Figure 12B:
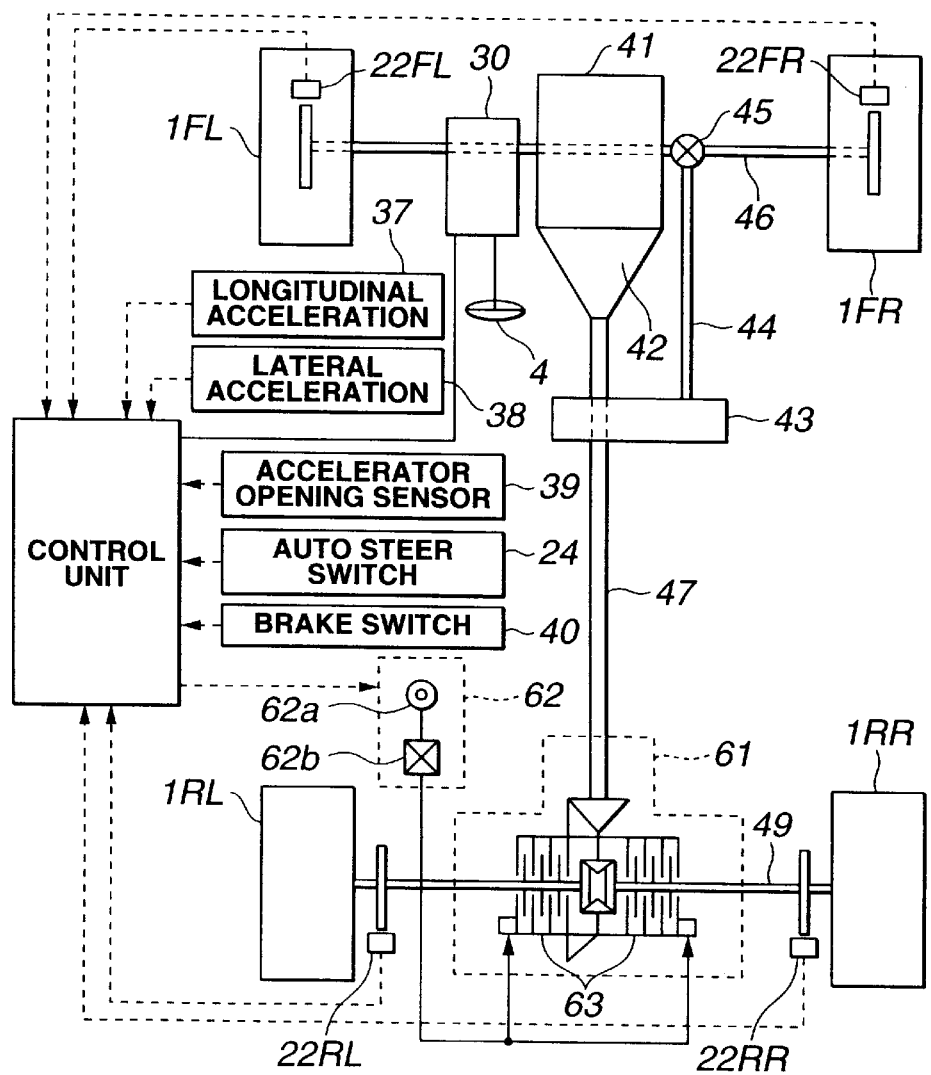
FIG. 12B is a schematic view showing the lane keeping system according to the fourth embodiment.

The rear wheel steering system is an effective actuating system for adjusting the steering characteristic in a low lateral acceleration region. The roll stiffness distribution control system or active suspension system, and the front and rear driving force distribution control system are effective in a high lateral acceleration region. Therefore, as expressed by the following equations (12), (13) and (14), it is possible to use coefficients Ky1 and Ky2 varying in accordance with the lateral acceleration as shown in FIG. 11.

$$\Delta Dp = Ky_1 \cdot KS_1 \cdot |\delta^*| \quad (12)$$

$$\Delta Te_{REF} = Ky_1 \cdot KS_2 \cdot |\delta^*| \quad (13)$$

$$\Delta\theta r_{REF} = Ky_2 \cdot KS_3 \cdot \delta^* \quad (14)$$

The first coefficient $Ky_1$ is set equal to zero as shown by a dot line in FIG. 11 when lateral acceleration |Yg| [g] is smaller than a threshold value $|y_G1|$ where |yg1| is smaller than 1 [g] (|yg1|<1). When lateral acceleration |Yg| [g] is greater than a threshold value |yg2| where $|y_G1|<|Y_G2|<1$ [g], the first coefficient Ky1 is set equal to one. When $|y_G1|<|Yg|<|y_G2|$, the first coefficient Ky1 is increased from zero to one as |Yg| increases. The second coefficient Ky2 is set equal to one as shown by a solid line in FIG. 11 when lateral acceleration |Yg| [g] is smaller than the threshold value $|Y_G1|$. When lateral acceleration |Yg| [g] is greater than the threshold value $|y_G2|$, the second coefficient Ky2 is set equal to zero. When $|y_G1|<|Yg|<|y_G2|$, the second coefficient Ky1 is decreased from one to zero as |Yg| increases.

In the relatively low lateral acceleration region, first coefficient Ky1 is set to zero and second coefficient Ky2 is set to one. Therefore, the modification quantities $\Delta Dp$ and $\Delta Te_{REF}$ are set to zero to prevent the adjustment of the steering characteristic with the roll stiffness distribution control and the front and rear driving force distribution control. The modification quantity $\Delta\theta_{REF}$ is effective, and the rear wheel steer angle control system is used to adjust the steering characteristic. In the relatively high lateral acceleration region, first coefficient Ky1 is set to one and second coefficient Ky2 is set to zero. Therefore, modification quantity $\Delta\theta_{REF}$ is zero, and the modification. quantities $\Delta Dp$ and $\Delta Te_{REF}$ are effective. Therefore, the roll stiffness distribution control system and/or the front and rear driving force distribution control system is used to adjust the steering characteristic.

FIGS. 12A, 12B, 13 and 14 show a lane keeping apparatus or lane keep control system according to a fourth embodiment of the present invention. In the fourth embodiment, a controlled vehicle is equipped, as a steering characteristic adjusting system or a second actuating system, with a differential limiting amount control system for controlling the differential limiting amount between the drive wheels in accordance with driver's accelerator operation or brake operation, and the lane keeping apparatus is arranged to adjust the steering characteristic by varying a manipulated variable in the form of the differential limiting control quantity of the drive wheels.

An output from an engine 41 is transmitted to a transfer 43 after the speed change operation of a transmission 42 at a selected gear ratio. Transfer 43 divides the output of engine 41, between the front drive axle's side and the rear drive axle's side. The front driving force is transmitted from transfer 43 to front drive wheels 1FL and 1FR through a front output shaft 44, a front differential gear 45, and front wheel drive shafts 46. The rear driving force is transmitted from transfer 43 to rear drive wheels 1RL and 1RR through a propeller shaft 47, a rear differential limiting unit (or limited-slip differential unit) 61 and rear wheel drive shafts 49.

Transfer 43 has therein a multiple disk transfer clutch. This transfer clutch can vary the driving force transmitted to the front wheels by controlling the fluid pressure to engage the transfer clutch with a hydraulic unit.

Differential limiting unit 61 has therein a differential limiting clutch 63 of a known type capable of varying the differential limiting force or slip limiting force between left and right rear drive wheels 1RL and 1RR in response to a clutch control fluid pressure supplied from a hydraulic unit 62. In this example, differential limiting clutch 63 includes left and right clutch sections. Hydraulic unit 62 of this example includes a fluid pressure source 62a for receiving an operating oil from an oil reservoir and supplying the operating oil under pressure, and a pressure control valve 62b for regulating the pressure of the operating oil supplied from pressure source 62a, and supplies the oil at the regulated fluid pressure to differential limiting clutch 63. Pressure control valve 62b is controlled by control unit 10.

A steering mechanism 30 is arranged to steer front wheels 1FL and 1FR as in the first embodiment. The vehicle is further provided with wheel speed sensors 22FL~22RR, auto steer switch 24, camera 25, camera controller 26, longitudinal acceleration sensor 37, lateral acceleration sensor 38, accelerator opening sensor (or accelerator position sensor) 39, and brake switch 40 capable of detecting a braking operation of a brake system of the vehicle. Signals are sent from the various input devices including the sensors and switch to control unit 10. Control unit 10 controls steering mechanism 30 and hydraulic unit 62.

In accordance with the input information supplied from the sensors, control unit 10 produces a steering assist force, and performs the automatic steering control as in the first embodiment. Moreover, in accordance with the input information, control unit 10 controls the clutch engagement force of differential limiting clutch 63 as in a conventional differential limiting system, so as to cancel understeer moment produced due to load transfer in the case of cornering acceleration to provide a cornering behavior as expected by the driver, and so as to cancel oversteer moment in the case of cornering deceleration to maintain the stability in braking operation in the process of cornering. When, in this case, the steering amount or wheel steer angle is being increased by the automatic steering control, the control system increases the differential limiting amount in the case of cornering acceleration, and decreases the differential limiting amount in the case of cornering braking. When the steering amount or wheel steer angle is being decreased by the automatic steering control, the control system decreases the differential limiting amount in the case of cornering acceleration, and increases the differential limiting amount in the case of cornering braking.

FIG. 13 shows a control procedure which control unit 10 performs for the automatic steering control and the differential limiting force control. This control procedure is executed as timer interrupt routine at regular time intervals of a predetermined sampling time, for example 10 msec.

At step S1, as in the preceding embodiments, control unit 10 reads signals of the sensors. In the fourth embodiment, control unit 10 reads actual front wheel steer angle $\delta_F$ of steering angle sensor 21, wheel speeds of wheel speed sensors 22FL~22RR, switch signal of auto steer switch 24, longitudinal acceleration Xg of longitudinal acceleration sensor 37, lateral acceleration Yg of lateral acceleration sensor 38, the accelerator opening degree of accelerator opening sensor 39, and signal from brake switch 40. Control unit 10 further obtains yaw angle $\Phi$, side deviation y from the center of the lane and curvature $\beta$ of the lane detected by camera controller 26.

Then, control unit 10 determines a vehicle speed V at step S2, and further determines target front wheel steer angle $\delta^*$ at step S3 as in the preceding embodiments.

At next step S51 following step S3, control unit 10 determines target differential limiting clutch engagement pressure $Td_{REF}$ as in a conventional differential limiting control system. For example, the differential limiting clutch engagement pressure $Td_{REF}$ is determined in accordance with one or more of lateral acceleration Yg, a left and right wheel speed difference calculated from the sensed left and right wheel speeds, a turning condition of the vehicle, and a vehicle accelerating or decelerating condition.

This example employs, as parameters used to calculate target differential limiting clutch engagement pressure $Td_{REF}$, any one or more of lateral acceleration Yg, left and right wheel speed difference, turning condition, and accelerating or decelerating condition. However, the present invention is not limited to this. It is optional to employ various other operating conditions for determining target differential limiting clutch engagement pressure $Td_{REF}$. For example, target differential limiting clutch engagement pressure $Td_{REF}$ may be determined in consideration of the slipping condition of the drive wheels sensed by one or more sensors.

At step S52 following step S51, control unit 10 examines whether auto steer switch 24 is on or not, by examining the switch signal from auto steer switch 24. When auto steer switch 24 is in the on state to command the automatic steering mode, then control unit 10 proceeds from step S52 to step S53.

At step S53, control unit 10 examines a turning condition of the vehicle. In this example, control unit 10 checks vehicle speed V and lateral acceleration Yg, and examines whether $|V| \geq |V_{TH}|$ and $|Yg| \geq |Yg_{TH}|$. Threshold values $V_{TH}$ and $Yg_{TH}$ are vehicle speed value and lateral acceleration value for discriminating a steep turning operation.

When vehicle speed V is equal to or higher than the vehicle speed threshold ($|V| \geq |V_{TH}|$) and at the same time lateral acceleration is equal to or higher than the lateral acceleration threshold ($|Yg| \geq |Yg_{TH}|$), then control unit 10 proceeds from step S53 to step S54, and calculates a target differential limiting clutch engagement pressure modification quantity $\Delta Td_{REF}$ according to the following equation (15).

$$\Delta Td_{REF} = KS_4 \cdot |\delta^*| \tag{15}$$

Figure 14:
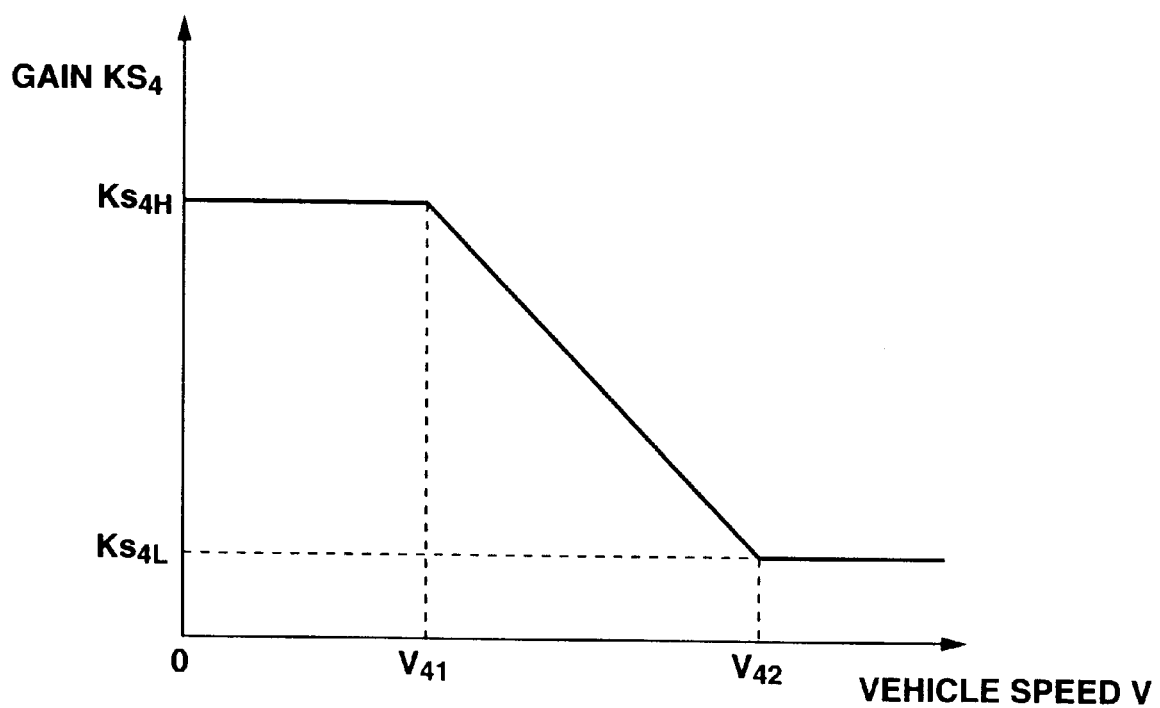
FIG. 14 is a graph showing a characteristic of a control gain $KS_4$ in the lane keeping system of the fourth embodiment.

In this equation, $KS_4$ is a control gain varying in dependence on vehicle speed V. In this example, control gain $KS_4$ decreases monotonically with increase in vehicle speed V as shown in FIG. 14. Control gain $KS_4$ is set invariably equal to a relatively large value $KS_{3H}$ in a low vehicle speed range from zero to a medium vehicle speed value $V_{41}$. In a vehicle speed range from $V_{41}$ to a relatively high vehicle speed value $V_{42}$, control gain $KS_3$ decreases linearly with increase in vehicle speed V. In a range equal to or higher than vehicle speed value $V_{42}$, control gain $KS_4$ is set invariably equal to a relatively small value $KS_{4L}$.

When either or both of the first condition about vehicle speed V that vehicle speed V is equal to or higher than the vehicle speed threshold ($|V| \geq |V_{TH}|$) and the second condition about lateral acceleration Yg that lateral acceleration is equal to or higher than the lateral acceleration threshold ($|Yg| \geq |Yg_{TH}|$) is unsatisfied, then control unit 10 proceeds from step S53 to step S55, and sets the target differential limiting clutch engagement pressure modification quantity $\Delta Td_{REF}$ to zero ($\Delta Td_{REF} = 0$).

At step S56 following step S54 or S55, control unit 10 modifies the target engagement pressure $Td_{REF}$ for differential limiting clutch 63, with modification quantity $\Delta Td_{REF}$ determined at step S54 or S55. In this embodiment, control unit 10 discriminates between an accelerating operation and a braking operation by examining the output signals of accelerator opening sensor 39 and brake switch 40, and determines a modified target differential limiting clutch engagement pressure $Tdh_{REF}$ by modifying $Td_{REF}$ with modification quantity $\Delta Td_{REF}$ according to the following equation (16) in the case of accelerating operation and according to the following equation (17) in the case of braking operation.

$$Tdh_{REF} = Td_{REF} + \Delta Td_{REF} \tag{16}$$

$$Tdh_{REF} = \text{MAX}(Td_{REF} - \Delta Td_{REF}, 0) \tag{17}$$

In equation (17), $Tdh_{REF}$ is set equal to a greater one of $Td_{REF} - \Delta Td_{REF}$ and zero. When the difference obtained by subtracting $\Delta Td_{REF}$ from $Td_{REF}$ is greater than zero, then $Tdh_{REF}$ is equal to $Td_{REF} - \Delta Td_{REF}$.

Thereafter, control unit 10 outputs a clutch control signal to engage clutch 17 at step S57, and delivers the steering control signal to bring actual front wheel steer angle $\delta_F$ toward target front wheel steer angle $\delta^*$ at step S58, to automatic steering motor 16. Moreover, at step S58, control unit 10 produces a differential limiting clutch control signal to achieve the modified differential limiting clutch engagement pressure $Tdh_{REF}$, and outputs this control signal to hydraulic unit 62. After step S58, control unit 10 returns to a main program.

When auto steer switch 24 is in the off state indicating the absence of command of the automatic steering mode, then control unit 10 proceeds from step S52 to step S59, and output clutch control signal to disengage clutch 17. Then, at next step S60, control unit 10 produces the differential limiting clutch control signal to achieve the clutch engagement pressure $Td_{REF}$ calculated at step S51, and delivers this control signal to hydraulic unit 62. Thereafter, control unit 10 returns to the main program.

In the absence of the command for the automatic steering, step S60 is reached through steps S1~S3, S51, S52 and S59, hydraulic unit 62 produces the fluid pressure in response to the control signal to command the clutch engagement pressure $Td_{REF}$ based on longitudinal acceleration Xg, lateral acceleration Yg and left and right wheel speed difference, and the differential limiting clutch 63 varies the actual differential limiting force in the normal differential limiting force control mode.

When auto steer switch 24 is turned on, step S55 is reached if the vehicle is in a straight driving operation, and the modification quantity $\Delta Td_{REF}$ is set equal to zero. Therefore, the target differential limiting clutch engagement pressure remains unmodified, and this control system carries out the control of differential limiting clutch 63 in the normal control mode without modification, as well as the automatic steering control.

If, as shown in FIG. 4A, the side deviation y of the controlled vehicle increases in the automatic steering mode in a straight ahead driving state, target front wheel steer angle $\delta^*$ is increased to reduce the side deviation. However, if a steep turning condition is not detected and hence the answer of step S53 is negative, this control system sets the modification quantity $\Delta Td_{REF}$ to zero at step S55, and carries out the control of differential limiting clutch 63 in the normal control mode.

When, from the straight driving operation, the vehicle enters a corner with acceleration as shown in FIG. 4B, target front wheel steer angle $\delta^*$ is increased by the automatic steering system, and a cornering operation starts as shown at A in FIG. 4B. If the vehicle speed IV and lateral acceleration |Yg| both exceed the respective thresholds $|V_{TH}|$ and $|Yg_{TH}|$, and hence the answer of step S53 becomes affirmative, modification quantity $\Delta Td_{REF}$ is calculated at step S54 in accordance with target front wheel steer angle $\delta^*$, and modified engagement pressure $Tdh_{REF}$ is determined according to equation (16) for accelerating condition (step S56).

In this case, modification quantity $\Delta Td_{REF}$ is increased with increase in target front wheel steer angle $\delta^*$, and modified engagement pressure $Tdh_{REF}$ is increased, during acceleration, as target front wheel steer angle $\delta^*$ is increased. In the case of cornering acceleration, therefore, the control system increases the differential limiting amount ($Tdh_{REF}$) in the direction to increase the tendency to oversteer, and thereby enhances the yawing response of the vehicle.

When the side deviation y is corrected to the outside of the turn and target front wheel steer angle $\delta^*$ decreases, the clutch pressure modification quantity $\Delta Td_{REF}$ is decreased, and the control system decreases the modified clutch engagement pressure $Tdh_{REF}$, and thereby improves the straight ahead running stability of the controlled vehicle, so that the vehicle behaves smoothly toward the outside of the turn.

If a braking operation starts from the cornering operation, step S54 is reached as long as the answer of decision step S53 is affirmative ($|V| \geq |V_{TH}|$ and $|Yg| \geq |Yg_{TH}|$), and the control system determines modification quantity ATdREF proportional to $\delta^*$ (provided $KS_4$ is constant), and determines the modified target clutch engagement pressure $Tdh_{REF}$. In this case, the vehicle is in the decelerating state, and hence equation (17) is used to calculate the modified target clutch engagement pressure $Tdh_{REF}$. Therefore, as target front wheel steer angle $\delta^*$ increases, modification quantity $\Delta Td_{REF}$ is increased and the modified target clutch engagement pressure $Tdh_{REF}$ is decreased. Thus, during cornering deceleration, the control system decreases the engagement pressure of differential limiting clutch 63 with increase in target front wheel steer angle $\delta^*$ and thereby adjusts the steering characteristic toward oversteer to enhance the yawing response.

When, from this cornering decelerating condition, the side deviation y is corrected toward the outside of the turn as shown at B in FIG. 4B and target front wheel steer angle $\delta^*$ decreases, the clutch pressure modification quantity $\Delta Td_{REF}$ is decreased, and the control system increases the modified clutch engagement pressure $Tdh_{REF}$, and thereby improves the straight ahead running stability of the controlled vehicle by decreasing the tendency to oversteer as $\delta^*$ decreases.

In this way, the lane keeping apparatus or lane keep control system according to the fourth embodiment can provide advantageous effects as in the first embodiment.

Decision step S53 is interposed to allow the adjustment of the steering characteristic only when the vehicle is in a relatively sharp turning state. Thus, the control system can adjust the steering characteristic effectively only when a turning motion variable such as lateral acceleration Yg is so high that the amount of load transfer in the left and right direction is sufficient to effect the adjustment of steering characteristic by the differential limiting clutch control.

In the fourth embodiment, the differential limiting clutch engagement pressure modification quantity $\Delta Td_{REF}$ is determined in accordance with target front wheel steer angle $\delta^*$. It is possible to determine the modification quantity $\Delta Td_{REF}$ in accordance with some other parameter indicative of the steering amount or yawing motion caused by the automatic steering system. For example, it is optional to calculate the modification quantity in accordance with the variation quantity $\Delta\delta^*$ of target front wheel steer angle $\delta^*$, or in accordance with target front wheel steer angle $\delta^*$ and the target front wheel steer angle variation $\Delta\delta^*$. Moreover, it is optional to calculate a target yaw rate $\phi_{REF}$ from the actual front wheel steer angle $\delta_F$ and vehicle speed V, to examine whether the yaw rate of the vehicle is in a converging direction (or settling direction) or not, by examining target yaw rate $\phi_{REF}$ and sensed actual yaw rate $\phi$, and to calculate the differential limiting clutch engagement pressure modification quantity $\Delta\theta r_{REF}$ in dependence on the result of the examination.

In the illustrated embodiments, the controlled vehicle has the power steering system. However, the present invention is applicable to vehicles having no power steering system.

Program section of steps S23, S24 and S25 to discriminate the stability of vehicle behavior based on the vehicle turning motion variable such as the vehicle side slip angle $\beta c$ is employed only in FIG. 6 of the second embodiment. However, it is possible to employ the program section of checking the side slip angle or some other turning motion variable in any of the first, third and fourth embodiments.

Program section of steps S53 and S55 to check the sharp turning condition in accordance with vehicle operating conditions such as vehicle speed V and lateral acceleration is employed only in FIG. 13 of the fourth embodiment. It is optional to employ this program section in any of the first, second and third embodiments.

This application is based on a prior Japanese Patent Application No. 2000-123431. The entire contents of this Japanese Patent Application No. 2000-123431 with a filing date of Apr. 25, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane keeping apparatus comprising:
   an automatic steering section comprising a steering actuator to bring an actual wheel steer angle of a controlled vehicle to a target wheel steer angle calculated for lane keeping; and
   a steering characteristic adjusting section to adjust a steering characteristic of the controlled vehicle, in the case of an automatic steering mode of the automatic steering section, in a first direction to improve a yawing response of the controlled vehicle or in a second direction to improve a running stability of the controlled vehicle in accordance with a steering amount of the automatic steering section,
   wherein the steering characteristic adjusting section is configured to adjust the steering characteristic of the controlled vehicle in the case of the automatic steering mode of the automatic steering section, in the first direction to improve the yawing response of the controlled vehicle when the steering amount of the controlled vehicle is increased and in the second direction to improve the running stability of the controlled vehicle when the steering amount of the controlled vehicle is decreased.

2. The lane keeping apparatus as claimed in claim 1, wherein the automatic steering section is configured to control the actual wheel steer angle of the controlled vehicle in accordance with a yaw angle of the controlled vehicle with respect to a lane, a side deviation of the controlled vehicle in the lane, and a curvature of the lane ahead of the controlled vehicle.

3. The lane keeping apparatus as claimed in claim 1, wherein the steering characteristic adjusting section comprises at least one of a front and rear roll stiffness distribution control system arranged to vary a front and rear roll stiffness distribution, a front and rear driving force distribution control system arranged to vary front and rear driving force distributions, a four wheel steering system arranged to vary front and rear wheel steer angles, and a differential limiting amount control system arranged to vary a drive wheel differential limiting amount.

4. The lane keeping apparatus as claimed in claim 3, wherein the front and rear roll stiffness distribution control system of the steering characteristic adjusting section comprises an active suspension system which comprises hydraulic cylinders each of which is disposed between a vehicle body and one of front and rear wheels of the controlled vehicle, to vary a distance between the vehicle body and the wheel, and the steering characteristic adjusting section is configured to adjust the steering characteristic in the first direction to improve the yawing response of the controlled vehicle by increasing fluid pressures supplied to the hydraulic cylinders for the rear wheels over fluid pressures for the front wheels, and to adjust the steering characteristic in the second direction to improve the running stability of the controlled vehicle by increasing the fluid pressures to the hydraulic cylinders for the front wheels over the fluid pressures for the rear wheels.

5. The lane keeping apparatus as claimed in claim 3, wherein the front and rear driving force distribution control system of the steering characteristic adjusting section comprises an actuator to vary a front driving force distribution allotted to front wheels and a rear driving force distribution allotted to rear wheels of the controlled vehicle, and the steering characteristic adjusting section is configured to adjust the steering characteristic in the first direction to improve the yawing response of the controlled vehicle by increasing the rear driving force distribution, and to adjust the steering characteristic in the second direction to improve the running stability of the controlled vehicle by increasing the front driving force distribution.

6. The lane keeping apparatus as claimed in claim 3, wherein the four wheel steering system of the steering characteristic adjusting section is arranged to vary a primary wheel steering amount of primary steerable wheels (1FL, 1FR) of the controlled vehicle and a secondary wheel steering amount of secondary steerable wheels of the controlled vehicle, and the steering characteristic adjusting section is configured to adjust the steering characteristic in the first direction to improve the yawing response of the controlled vehicle by decreasing the secondary wheel steer amount in an in-phase direction, and to adjust the steering characteristic in the second direction to improve the running stability of the controlled vehicle by increasing the secondary wheel steering amount in the in-phase direction.

7. The lane keeping apparatus as claimed in claim 3, wherein the differential limiting amount control system of the steering characteristic adjusting section is arranged to vary a differential limiting amount of drive wheels of the controlled vehicle, and the steering characteristic adjusting section is configured to adjust the steering characteristic in the first direction to improve the yawing response by increasing the differential limiting amount, in the second direction to improve the running stability by decreasing the differential limiting amount in the case of cornering acceleration, and to adjust the steering characteristic in the first direction to improve the yawing response by decreasing the differential limiting amount, and in the second direction to improve the running stability by increasing the differential limiting amount in the case of cornering deceleration.

8. The lane keeping apparatus as claimed in claim 3, wherein the lane keeping apparatus further comprises a sensor to sense a degree of turning motion of the controlled vehicle; the steering characteristic adjusting section comprises first and second systems which are one and another of the front and rear roll stiffness distribution control system, the front and rear driving force distribution control system, the four wheel steering system and the differential limiting amount control system; and the steering characteristic adjusting section further comprises a control unit to adjust the steering characteristic by using a selected one of the first and second systems selected in accordance with the degree of turning motion.

9. The lane keeping apparatus as claimed in claim 8, wherein the first system is the roll stiffness distribution control system and the second system is the four wheel steering system, the sensor senses a lateral acceleration of the controlled vehicle as the degree of turning motion, and the control unit is configured to adjust the steering characteristic with the four wheel steering system when the lateral acceleration is in a smaller lateral acceleration region, and with the roll stiffness distribution control system when the lateral acceleration is in a larger lateral acceleration region larger than the smaller lateral acceleration region.

10. The lane keeping apparatus as claimed in claim 8, wherein the first system is the front and rear driving force distribution control system and the second system is the four wheel steering system, the sensor senses a lateral acceleration of the controlled vehicle as the degree of turning motion, and the control unit is configured to adjust the steering characteristic with the four wheel steering system when the lateral acceleration is in a smaller lateral acceleration region, and with the front and rear driving force distribution control system when the lateral acceleration is in a larger lateral acceleration region larger than the smaller lateral acceleration region.

11. The lane keeping apparatus as claimed in claim 1, wherein the lane keeping apparatus further comprises a sensor to sense a vehicle turning condition indicative of steepness of a turn of the controlled vehicle, and the steering characteristic adjusting section is configured to adjust the steering characteristic only when the vehicle turning condition is equal to or greater than a threshold.

12. The lane keeping apparatus as claimed in claim 1, wherein the lane keeping apparatus further comprises a vehicle behavior sensor to sense a vehicle behavior of the controlled vehicle, and the steering characteristic adjusting section is configured to detect a predetermined condition having a tendency to lower the running stability of the controlled vehicle in accordance with the vehicle behavior and to refrain from adjusting the steering characteristic in the first direction to improve the yawing response when the predetermined condition is detected.

13. The lane keeping apparatus as claimed in claim 1, wherein the lane keeping apparatus further comprises a sensor for determining a vehicle speed of the controlled vehicle, and the steering characteristic adjusting section is configured to adjust the steering characteristic in the direction to improve the running stability of the controlled vehicle as the vehicle speed increases.

14. The lane keeping apparatus as claimed in claim 1, wherein the steering actuator of the automatic steering section is configured to steer front wheels of the controlled vehicle to reduce a deviation of the actual wheel steer angle, which is an actual front wheel steer angle of the controlled vehicle, from the target wheel steer angle, which is a target front wheel steer angle calculated for lane keeping; and wherein the steering characteristic adjusting section is configured to determine a modification quantity in accordance with the target front wheel steer angle, and to adjust the steering characteristic of the controlled vehicle in accordance with the modification quantity in the case of the automatic steering mode of the automatic steering section.

15. The lane keeping apparatus as claimed in claim 14, wherein the steering characteristic adjusting section comprises a control unit to increase the modification quantity with increase in the target front wheel steer angle.

16. The lane keeping apparatus as claimed in claim 15, wherein the control unit determines the modification quantity which is a product obtained by multiplying the target front wheel steer angle by a control gain; and wherein the lane keeping apparatus further comprises a sensor to determine a vehicle speed of the controlled vehicle, and the control unit is configured to determine the control gain in accordance with the vehicle speed so that the control gain is decreased as the vehicle speed increases.

17. The lane keeping apparatus as claimed in claim 1, wherein the steering characteristic adjusting section comprises a vehicle control system arranged to vary a manipulated variable affecting the steering characteristic of the vehicle, and a control unit to adjust the steering characteristic of the vehicle by modifying the manipulated variable in accordance with the steering amount of the automatic steering section.

18. A lane keeping apparatus comprising:
automatic steering means for calculating a target wheel steer angle for lane keeping and for varying a first manipulated variable to bring an actual wheel steer angle of a controlled vehicle to the target wheel steer angle; and
steering characteristic adjusting means for adjusting a steering characteristic of the controlled vehicle in the case of an automatic steering mode of the automatic steering means, by varying a second manipulated variable affecting the steering characteristic of the vehicle, in accordance with a parameter representing a steering amount of the automatic steering means in one of a first direction to improve a yawing response of the controlled vehicle and a second direction to improve a running stability of the controlled vehicle in dependence on the steering amount, the second manipulated variable being a manipulated variable distinct from the first manipulated variable.

19. The lane keeping apparatus as claimed in claim 18, wherein in the case of the automatic steering mode, the steering characteristic adjusting means includes means for adjusting the steering characteristic of the controlled vehicle in the first direction to improve the yawing response of the controlled vehicle when the steering amount of the controlled vehicle is increased and in the second direction to improve the running stability of the controlled vehicle when the steering amount of the controlled vehicle is decreased.

20. A lane keep control method comprising:
calculating a target wheel steer angle to achieve an automatic steering control for lane keeping;
determining a modification quantity to adjust a steering characteristic of the controlled vehicle in accordance with a parameter representing a steering amount of the automatic steering control; and
controlling an actual wheel steer angle of the controlled vehicle by varying a first manipulated variable so as to bring the actual wheel steer angle to the target wheel steer angle, and adjusting the steering characteristic of the controlled vehicle, by modifying a second manipulated variable affecting the steering characteristic of the vehicle, in accordance with the modification quantity in one of a first direction to improve a yawing response of the controlled vehicle and a second direction to improve a running stability of the controlled vehicle.

21. The method as claimed in claim 20, wherein the steering characteristic of the controlled vehicle is adjusted in the first direction to improve the yawing response of the controlled vehicle when the steering amount of the controlled vehicle is increased, and in the second direction to improve the running stability of the controlled vehicle when the steering amount of the controlled vehicle is decreased.

22. A vehicle comprising:
a first actuating system comprising a lane keeping automatic steering actuator to vary a first manipulated variable to bring an actual wheel steer angle of the vehicle to a target wheel steer angle calculated for lane keeping;
a second actuating system to vary a second manipulated variable affecting a steering characteristic of the vehicle; and
a control unit to adjust the steering characteristic of the vehicle by modifying the second manipulated variable in accordance with a steering amount of the first actuating system.

23. The vehicle as claimed in claim 22, wherein the control unit is configured to adjust the steering characteristic of the controlled vehicle in a first direction to improve the yawing response of the controlled vehicle when the steering amount of the controlled vehicle is increased and in a second direction to improve the running stability of the controlled vehicle when the steering amount of the controlled vehicle is decreased.

* * * * *